United States Patent
Imaizumi et al.

(10) Patent No.: US 7,417,755 B2
(45) Date of Patent: Aug. 26, 2008

(54) IMAGE PROCESSING SYSTEM, SERVER, IMAGE PROCESSING APPARATUS, MANAGEMENT METHOD, COMPUTER PROGRAM, AND STORAGE MEDIUM

(75) Inventors: Shoji Imaizumi, Shinshiro (JP); Yoichi Kawabuchi, Itami (JP); Yoshikazu Ikenoue, Itami (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 906 days.

(21) Appl. No.: 10/108,638

(22) Filed: Mar. 29, 2002

(65) Prior Publication Data
US 2002/0140974 A1 Oct. 3, 2002

(30) Foreign Application Priority Data
Mar. 30, 2001 (JP) ............................. 2001-102626

(51) Int. Cl.
G06F 3/12 (2006.01)
G06K 15/02 (2006.01)
H04N 1/00 (2006.01)
G01D 18/00 (2006.01)

(52) U.S. Cl. ............... 358/1.15; 358/406; 358/408; 358/504; 709/203; 702/85

(58) Field of Classification Search ............... 358/1.12, 358/1.13, 1.14, 1.15, 407, 468, 406, 504, 358/408; 715/744; 709/203; 702/85
See application file for complete search history.

(56) References Cited

U.S. PATENT DOCUMENTS

| | | | | |
|---|---|---|---|---|
| 5,548,375 A * | 8/1996 | Mitsuya et al. | ............... | 399/9 |
| 5,933,676 A * | 8/1999 | Ohno | ............... | 399/8 |
| 5,950,036 A * | 9/1999 | Konishi | ............... | 399/8 |
| 5,978,559 A * | 11/1999 | Quinion | ............... | 358/1.15 |
| 6,048,117 A * | 4/2000 | Banton | ............... | 400/120.09 |
| 6,070,000 A * | 5/2000 | Mori | ............... | 358/1.15 |
| 6,160,968 A * | 12/2000 | Noda | ............... | 399/8 |
| 6,348,971 B2 * | 2/2002 | Owa et al. | ............... | 358/1.15 |
| 6,369,909 B1 * | 4/2002 | Shima | ............... | 358/1.15 |
| 6,452,692 B1 * | 9/2002 | Yacoub | ............... | 358/1.15 |
| 6,456,400 B1 * | 9/2002 | Ikegami et al. | ............... | 358/434 |
| 6,552,813 B2 * | 4/2003 | Yacoub | ............... | 358/1.1 |
| 6,573,910 B1 * | 6/2003 | Duke et al. | ............... | 715/740 |
| 6,631,008 B2 * | 10/2003 | Aoki | ............... | 358/1.15 |
| 6,643,029 B2 * | 11/2003 | Kumada et al. | ............... | 358/1.9 |
| 6,654,135 B2 * | 11/2003 | Mitani | ............... | 358/1.15 |
| 6,822,754 B1 * | 11/2004 | Shiohara | ............... | 358/1.15 |

(Continued)

FOREIGN PATENT DOCUMENTS

EP 0825553 A2 * 2/1998

(Continued)

Primary Examiner—Mark K Zimmerman
Assistant Examiner—Beniyam Menberu
(74) Attorney, Agent, or Firm—Buchanan Ingersoll & Rooney PC

(57) ABSTRACT

In an image processing system in which a server, a plurality of image processing apparatuses that execute image quality stabilization processing, and a terminal apparatus are connected to each other via a network, the server calculates, with respect to each image processing apparatus, the time period elapsed since the image quality stabilization processing was last executed, and selects the apparatus having the shortest elapsed time period as the apparatus to execute a job requested by the terminal apparatus.

27 Claims, 28 Drawing Sheets

U.S. PATENT DOCUMENTS

| | | | |
|---|---|---|---|
| 6,862,103 B1* | 3/2005 | Miura et al. | 358/1.15 |
| 6,885,474 B2* | 4/2005 | Kimura | 358/1.9 |
| 6,940,615 B1* | 9/2005 | Shima | 358/1.15 |
| 6,950,197 B1* | 9/2005 | Nakajima | 358/1.1 |
| 6,975,414 B2* | 12/2005 | Nagatomi et al. | 358/1.13 |
| 6,975,418 B1* | 12/2005 | Ohta et al. | 358/1.15 |
| 6,989,907 B1* | 1/2006 | Jeyachandran et al. | 358/1.15 |
| 7,099,025 B2* | 8/2006 | Nagashima | 358/1.15 |
| 2001/0038461 A1* | 11/2001 | Murakami et al. | 358/1.13 |
| 2002/0044307 A1* | 4/2002 | Kise | 358/504 |
| 2002/0105675 A1* | 8/2002 | Toyofuku | 358/1.15 |
| 2002/0135804 A1* | 9/2002 | Toyofuku | 358/1.15 |
| 2002/0186275 A1* | 12/2002 | Usui | 347/43 |
| 2003/0050873 A1* | 3/2003 | Niki | 705/28 |
| 2003/0053112 A1* | 3/2003 | Motosugi et al. | 358/1.14 |
| 2003/0090688 A1* | 5/2003 | Kimura | 358/1.9 |
| 2005/0219582 A1* | 10/2005 | Kimura | 358/1.9 |
| 2006/0126137 A1* | 6/2006 | Coons et al. | 358/504 |

FOREIGN PATENT DOCUMENTS

| | | | |
|---|---|---|---|
| JP | 07-121322 | | 5/1995 |
| JP | 07-200215 | * | 8/1995 |
| JP | 2002-019246 | * | 1/2002 |

* cited by examiner

Fig.3

| | Environment Variance | Apparatus Parameter | Image Quality Attribute | Power-on Time | Prior Stabilization Time | Scheduled Stabilization Time | Group Name |
|---|---|---|---|---|---|---|---|
| Scanner 401 | Pe(S1) | P(S1) | F(S1) | 8:20 | 10:20 | 12:20 | GE2 |
| Scanner 402 | Pe(S2) | P(S2) | F(S2) | 9:30 | 10:30 | 11:30 | GE3 |
| Scanner 403 | — | — | — | *:*:* | *:*:* | *:*:* | — |
| ... | ... | ... | ... | ... | ... | ... | ... |
| Printer 501 | Pe(P1) | P(P1) | F(P1) | 8:20 | 10:20 | 12:20 | GE2 |
| Printer 502 | Pe(P2) | P(P2) | F(P2) | 12:30 | 10:30 | 11:30 | GE3 |
| Printer 503 | Pe(P3) | P(P3) | F(P3) | 15:00 | 13:00 | 16:00 | GE1 |
| ... | ... | ... | ... | ... | ... | ... | ... |

| | Target Image Quality Level | Schedule Information | |
| --- | --- | --- | --- |
| | | Threshold A | Threshold B |
| Scanner 401 | GL2 | 10 | 5 |
| Scanner 402 | GL2 | 10 | 5 |
| Scanner 403 | GL1 | 5 | 5 |
| ... | ... | ... | ... |
| Printer 501 | GL1 | 5 | 15 |
| Printer 502 | GL1 | 5 | 15 |
| Printer 503 | GL2 | 10 | 15 |
| ... | ... | ... | ... |

| Job Number | Job Request Terminal | Image Mode | Color Mode | No. of Pages per Original | No. of Copies | Scheduled Job Initiation Time | Scheduled Job Completion Time | Selected Apparatus |
|---|---|---|---|---|---|---|---|---|
| 1 | PC303 | text | B/W | 10 | 2 | 10:20 | 10:25 | Printer 501 |
| 2 | PC301 | text | B/W | 15 | 1 | 10:22 | 10:25 | Printer 503 |
| 3 | PC303 | photo | color | 5 | — | 10:24 | 10:30 | Scanner 402 |
| 4 | PC302 | photo | color | 8 | 1 | 10:25 | 10:32 | Printer 501 |
| 5 | PC302 | text | B/W | 20 | 1 | 11:01 | 11:04 | Printer 502 |
| ... | ... | ... | ... | ... | ... | ... | ... | ... |

Fig.12

| Group Allotment Range | Allotment Groups |
|---|---|
| K1≦Pe<K2 | GE1 |
| K2≦Pe≦K3 | GE2 |
| K3<Pe≦K4 | GE3 | ns
IMAGE PROCESSING SYSTEM, SERVER, IMAGE PROCESSING APPARATUS, MANAGEMENT METHOD, COMPUTER PROGRAM, AND STORAGE MEDIUM

This application is based on application no. 2001-102626 filed in Japan, the content of which is hereby incorporated by reference.

BACKGROUND OF THE INVENTION

1. Field of the Invention

The present invention relates to an image processing system, a server, an image processing apparatus, a management method, a computer program, and a storage medium, the system including the server, a plurality of image processing apparatuses, and a terminal apparatus, which are connected to each other via a network.

2. Related Art

In printers and other known image processing apparatuses a reduction in image quality levels occurs when jobs are executed continuously under fixed control conditions. Variations in internal temperature and wear and tear on the photosensitive drum and other structural elements, for example, result in the image density and image positioning relating to an executed jobs failing to meet target control values, and the quality level of processed images (hereafter "image quality level") suffers as a result. In order to counter this deterioration in the image quality level, image quality stabilization processing is conducted in known image processing apparatuses to fine tune the control conditions in accordance with the existing environment of the apparatus.

In the image quality stabilization processing, control variables that affect image quality in the image processing apparatus are determined. If the image processing apparatus is a printer or similar image forming apparatus, for example, tests are conducted to detect the density of a plurality of toner patterns of differing densities formed on the surface of the photosensitive drum as part of the test process, and the optimal adjustment values for control variables such as the developing bias voltage of the developing unit and the grid voltage of the charging unit are determined based on the test results. Other control variables affecting image quality include heater output and the oil supply levels of the heat fixing unit.

If the image processing apparatus is a scanner or similar image reading apparatus, on the other hand, control variables include the exposure voltage applied to the exposure lamp.

Frequent execution of the image quality stabilization processing in a printer, for example, means that the developing bias voltage and other control variables are maintained at or near their optimal performance values, and a high image quality of print output can be achieved as a result. However, one of the disadvantages of frequent execution of the stabilization processing is the fact that jobs cannot be processed while the stabilization processing is being executed. Inconvenience results for the user in terms of waiting time.

In known image processing apparatuses this problem has been tackled, for example, by only executing the image quality stabilization processing after predetermined time periods so as to maintain a certain level image quality without compromising print output efficiency. By conducting the stabilization processing in this way, the achievable image quality of print output gradually deteriorates due to changes in internal temperature and other control variables, until the stabilization processing is once again conducted after the predetermined time period, at which point the image quality is returned to a high level. By repeating this cycle it is thus possible to maintain the image quality at a regular level or better over the long run.

Recent years have seen an increase in the number of business offices employing image processing systems in which printers and other image processing apparatuses capable of executing image quality stabilization processing are connected via a local area network (LAN) or similar network.

However, the fact is that users of such a system are not guaranteed a high image quality of print output despite the inclusion in the system of image forming apparatuses capable of executing the image quality stabilization processing.

For example, in the case of a known image processing system employing printers, each printer controls the execution of its own stabilization processing, which means that the user cannot know which printer has executed the stabilization processing and when. In this system the user has little choice but to choose, for example, the printer positioned closest as the printer to execute a print job. If the chosen printer happens to have just completed executing the stabilization processing, then a comparatively high quality of print output will be achieved. However, if a long time period has elapsed since the stabilization processing was last executed, the image quality of print output will be reduced in comparison to the printer that has just completed the stabilization processing. This known image processing system is thus unable to guarantee that print jobs will be executed by a printer capable of producing print output of a satisfactory image quality.

Of course, this problem relates not only to such image forming apparatuses as printers but also to image reading apparatuses such as scanners or any other image processing apparatuses that executes image quality stabilization processing.

SUMMARY OF THE INVENTION

In view of the issues discussed above, a first objective of the present invention is to provide an image processing system that selects, as an apparatus to execute image processing, the apparatus capable of achieving a high image quality.

A second objective is to provide a server included in the image processing system.

A third objective is to provide an image processing apparatus included in the image processing system.

A fourth objective of the invention is to provide a management method for managing the image processing apparatus.

A fifth objective is to provide a computer program for having a server execute the management method.

A sixth objective is to provide a computer-readable storage medium for storing the computer program.

The first objective can be achieved by an image processing system having a server, a terminal apparatus, and a plurality of image processing apparatuses that execute image quality stabilization processing, in which the server is connected via a network to the terminal apparatus and each image processing apparatus, and includes (a) a reception unit for receiving from the terminal apparatus a request to execute a job related to an image processing operation, (b) an acquisition unit for acquiring information relating to an execution condition of the image quality stabilization processing with respect to each image processing apparatus, (c) a selection unit for selecting, based on the acquired information, one of the image processing apparatuses to execute the requested job, (d) and an instruction unit for instructing the selected image processing apparatus to execute the requested job.

Here, the "acquiring" conducted by the acquisition unit includes acquiring the information relating to the execution condition of the image quality stabilization processing from a memory such as RAM or ROM in the server, as well as from each image processing apparatus via the network.

This structure of the invention makes it is possible to select the apparatus having the shortest elapsed time since the image quality stabilization processing was last executed (i.e. the apparatus capable of executing image processing of the highest image quality), and thus reduce the inconvenience to the user of low image quality print output resulting from the user selecting the external apparatus to execute the job arbitrarily without knowing the image quality capabilities of each external apparatus included in the image processing system. In comparison with known systems, the image processing system according to the present invention is therefore able to achieve a high degree of efficiency, quality, and user-friendliness with respect to the execution of image processing operations.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 3 shows the content of a machine information table 121 in server 100;

FIG. 6 shows the content of a management information table 122 in server 100;

FIG. 7 shows the content of a job management table 123 in server 100;

FIG. 12 shows an exemplary structure of a group allotment table containing information relating to a group allotment range;

DETAILED DESCRIPTION OF THE PREFERRED EMBODIMENTS

An image processing system 1 of the present invention is described below with reference to the diagrams.

First Embodiment

Figure 1:
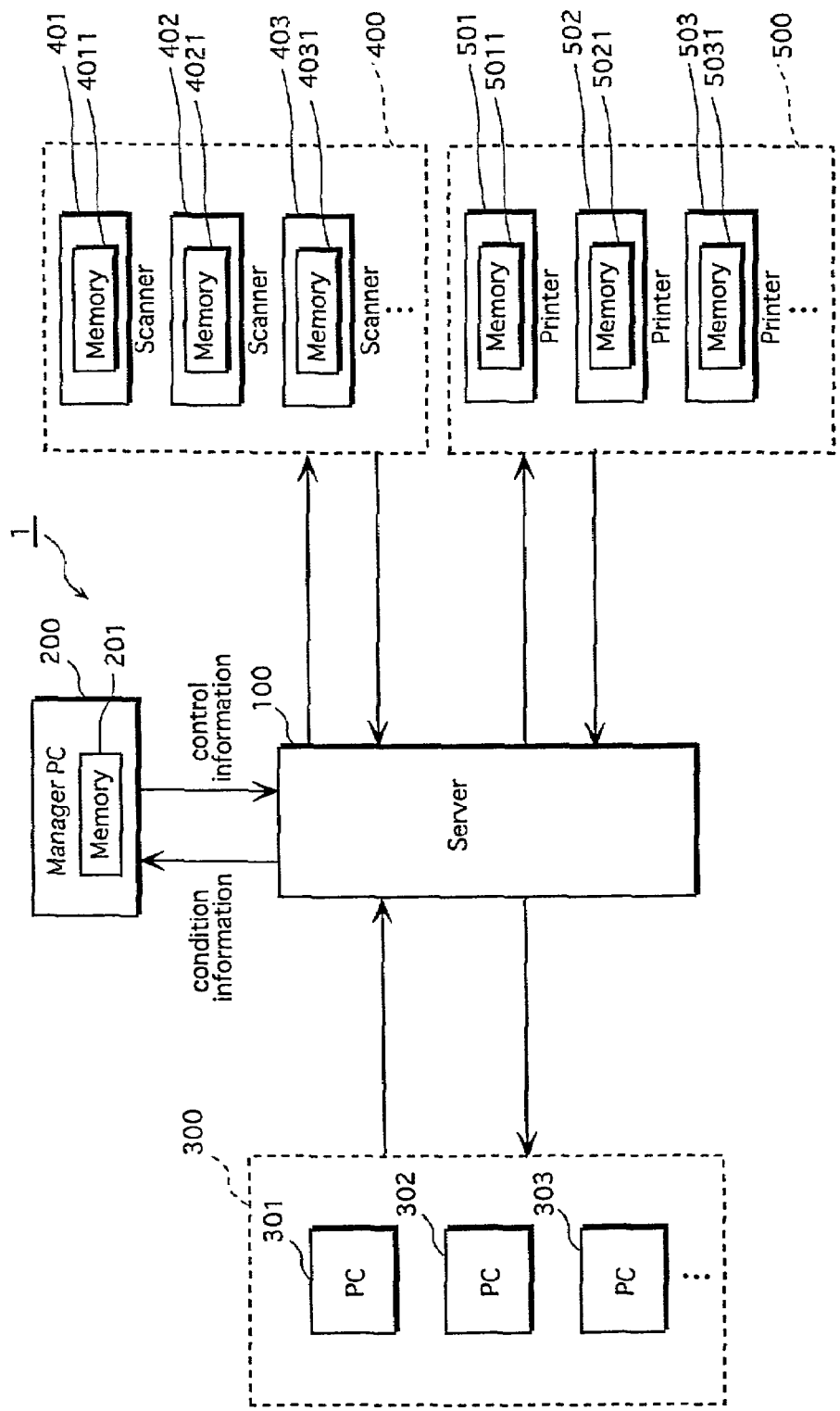
FIG. 1 shows an exemplary structure of an image processing system 1 according to a first embodiment.

FIG. 1 shows an exemplary structure of image processing system 1 (hereafter "system 1") according to a first embodiment of the present invention.

System 1 includes a server 100, personal computers 301, 302, 303, . . . (PC group 300), scanners 401, 402, 403, . . . (scanner group 400), printers 501, 502, 503, . . . (printer group 500), and a personal computer 200 (hereafter "manager PC 200") operated by a manager in order to manage system 1. The elements of system 1 are connected to each other via a LAN or similar network.

Manager PC 200 and the PCs comprising PC group 300, in addition to having a computer body that includes a hard disk (HD), a monitor connected to the body, and a keyboard, each include a network compatible operating system (OS) preinstalled in the HD, a print driver, and application software for conducting wordprocessing and the like.

When one of the PCs in PC group 300 requests print processing of a document created using the application software, then image data, a print request signal, and print information is sent to server 100. The print information is indicated by a user and shows the number of pages per original document, the number of copies required, an image mode (e.g. text or photograph?), and a color mode (e.g. monochrome or full color?), among other information.

The image and color modes can otherwise be determined automatically from an analysis of the image data without the need for a user instruction. In this case, the image mode may be selected automatically based on the amount of halftone data in the image data, such that "text" is selected when the halftone data is below a predetermined percentage, and "photo" is selected when the halftone data is above a predetermined percentage. Also, the image mode information can be set to include a number of intermediate gradation levels between "text" and "photo." The color mode, on the other hand, may be selected automatically based on the color pixel data in the image data, such that "monochrome" is selected when the color pixel data is below a predetermined percentage, and "full color" is selected when the color pixel data is above a predetermined percentage. Furthermore, both the image and color modes can be set per job unit or per document unit.

The image data, print request signal, and print information can be sent separately to the external apparatus selected to execute a requested job, or alternatively, they can be included together in a file which is then sent to the selected apparatus.

When the job is a request for a scanner to conduct image reading processing, scan information showing the image mode and a resolution mode can be sent to server 100 together with the image read request signal.

In addition to providing various services for the personal computers included in system 1, server 100 can also operate as a management apparatus for managing the external apparatuses included in system 1.

On receipt of a print request, server 100 selects an optimal printer from printer group 500 based on the print information sent from the PC requesting the job, and sends the image data received from the PC to the selected printer together with a job execution command and the print information.

On receipt of an image read request, server 100 selects an optimal scanner from scanner group 400 based on the scan information sent from the PC requesting the job, and sends a job execution command and print information to the selected scanner. Server 100 then receives the read image data from the scanner and sends the read image data to the PC. The selection of an optimal apparatus as part of the print processing and image reading processing will be described in detail in relation to job allotment processing.

Server 100 can also send a stabilization execution command to any scanner in group 400 and any printer in group 500 in order to have the respective apparatus execute image quality stabilization processing (hereafter "stabilization processing" or simply "stabilization").

On receipt of a job execution command from server 100, the selected printer in printer group 500 forms an image on paper according to the well known electronic photographic method. When a stabilization execution command is sent from server 100, the printers receiving the command each execute the stabilization processing and send optimal adjustment value information (hereafter "apparatus parameter information") determined as a result of the processing to server 100.

The scanners in group 400 are well known apparatus that function to obtain image data by irradiating a document with an exposure lamp and reading the reflected light by means of a CDD image sensor or similar photoelectric conversion unit. On receipt of a job execution command from server 100, the selected scanner initiates the image reading operation on the document and sends the read image data to server 100. The operation executed by a scanner on receipt of a stabilization execution command from server 100 is the same as that executed by a printer. Specifically, the respective scanner executes the stabilization processing and sends the resulting apparatus parameter information to server 100.

Printers 501, 502, 503, . . . , and scanners 401, 402, 403, . . . (these image processing apparatus being hereafter referred to collectively as "external apparatus") each include a nonvolatile memory unit 5011, 5021, 5031, . . . , 4011, 4021, 4031, . . . (hereafter "memory"), respectively. In addition to apparatus parameter information, the memory of each external apparatus stores machine information showing the particular characteristics of the respective external apparatus. The machine information includes environment variance information and image quality attribute information, details of which will be given in a later section.

When power is supplied, each external apparatus reads its respective machine information and sends the read information to server 100 together with power-on information. And when power is cut, each external apparatus sends power-off information to server 100.

Manager PC 200 includes a memory 201 that stores management information required to manage system 1, examples of this information being target image quality level information and schedule information. Any inputting of new management information or adjustment of existing information is conducted by the manager. When an input or adjustment is conducted, manager PC 200 sends a signal to server 100 via the network to inform server 100 of the fact. Based on the various information sent from server 100, manager PC 200 also manages the execution condition of stabilization processing in an external apparatus and the group formation condition after an execution of group formation processing (described below). Manager PC 200 can have this information displayed on a monitor if the manager so requires.

Server 100, the PCs, and the external apparatus each have their own IP address, and print requests and image data can be sent to the relevant apparatus by indicating the appropriate IP address.

Structure of Server 100

Figure 2:
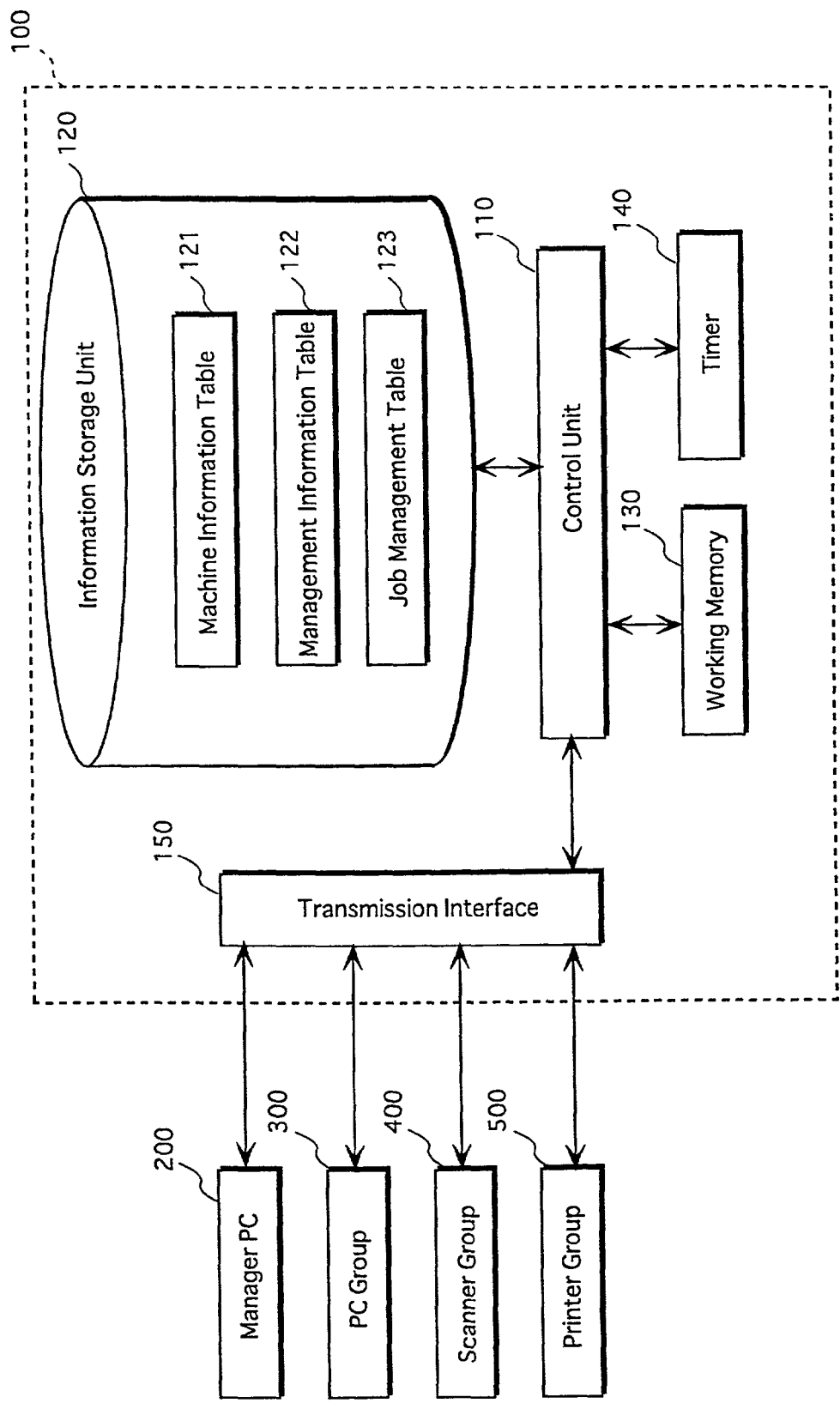
FIG. 2 is a block diagram showing a structure of a server 100 included in image processing system 1.

FIG. 2 is a block diagram showing the structure of server 100.

Server 100 includes a control unit 110, an information storage unit 120, a working memory 130, a timer 140 and a communication interface 150.

Control unit 110 controls the processing conducted in server 100 via communication interface 150 based on the information and commands received from the external apparatuses and terminal apparatuses (i.e. PCs). For example, control unit 110 updates information stored in information storage unit 120, and instructs the external apparatuses to execute jobs or conduct stabilization processing.

Working memory 130 includes a volatile RAM, and functions (i) to temporarily store information received by server 100 from the terminal and external apparatuses, and (ii) to read information from information storage unit 120 when control unit 110 controls the processing in server 100.

Timer 140 measures a time lapse. In the group formation processing, for example, timer 140 measures the time that has elapsed since the previous processing, and in the job allotment processing, timer 140 measures the time elapsed since the previous stabilization processing.

Information storage unit 120 includes a hard disk, and functions to store a machine information table 121, a management information table 122, and a job management table 123.

FIG. 3 shows the content of machine information table 121.

Written into table 121 is information relating to each external -apparatus. This information includes environment variance information, apparatus parameter information, image quality information, a power-on time, a prior stabilization time, a scheduled stabilization time, and group name information.

The environment variance information shows the degree to which variations in the internal environment conditions (temperature, humidity, etc.) of an external apparatus affect the quality level of an image obtained by executing a job. Here, the volatility of image quality levels to internal environment changes is referred to as "environment volatility."

The environment volatility of each external apparatus is determined though pre-testing. In a printer the environment volatility can be represented as a rate of variation in image density with respect to internal temperature changes.

Figure 4:
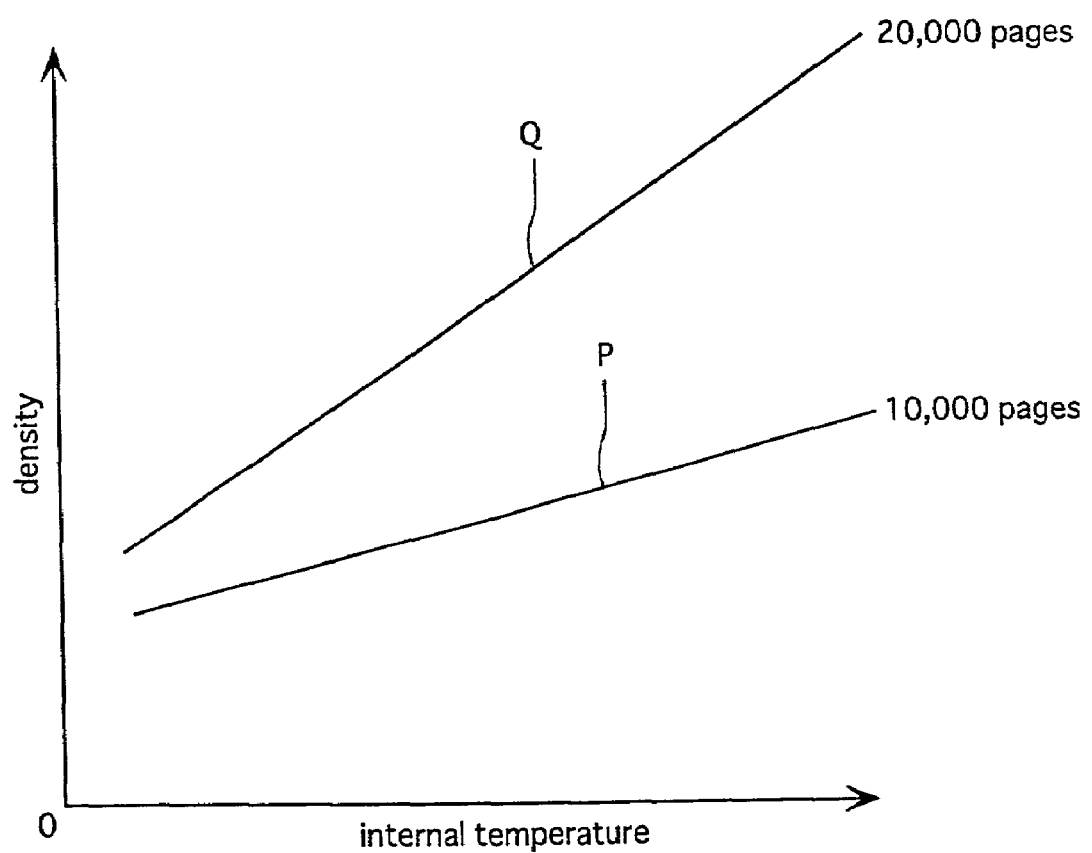
FIG. 4 is a graph showing an exemplary environment volatility of an arbitrary printer included in a printer group 500.

FIG. 4 is a graph showing an exemplary environment volatility of an arbitrary printer in group 500.

Internal temperature is measured along the horizontal axis and image density is measured along the vertical axis. The slope of straight lines P and Q represents the environment volatility of the printer. Straight lines P and Q show the relationship between density and temperature when the number of printed sheets is less than ten thousand (i.e. P<10,000) and between ten and twenty thousand (i.e. $10,000 \leqq Q \leqq 20,000$), respectively.

As shown in FIG. 4, the environment volatility in the printer increases with increases in the number of printed sheets. This is due to the deterioration in the sensitivity of the photosensitive drum over time, making the printer more susceptible to changes in internal temperature.

When the external apparatus is a scanner, the environment volatility shows variations in the level of exposure with respect to internal temperature changes, and as with the printer, the environment volatility varies depending on the number of read sheets.

Returning to FIG. 3, the apparatus parameter information in machine information table 121 shows optimal adjustment values, which as mentioned above are determined for each external apparatus by executing the stabilization processing. Examples of such information with respect to a printer include the optimal adjustment values for the developing bias voltage in the developing unit and the grid voltage in the charging unit.

Furthermore, it should be noted that although the apparatus parameter information may include the optimal adjustment value of elements other than those given above, for ease of comprehension, the description in this embodiment will be limited to the optimal adjustment values for the developing bias voltage in the case of a printer and the exposure voltage applied to the exposure lamp in the case of a scanner.

Also, the description of the stabilization processing will be limited to the determination of the optimal adjustment values for each external apparatus.

The image quality attribute information in FIG. 3 shows the image quality levels that can be sustained for different execution frequencies of the stabilization processing.

Figure 5:
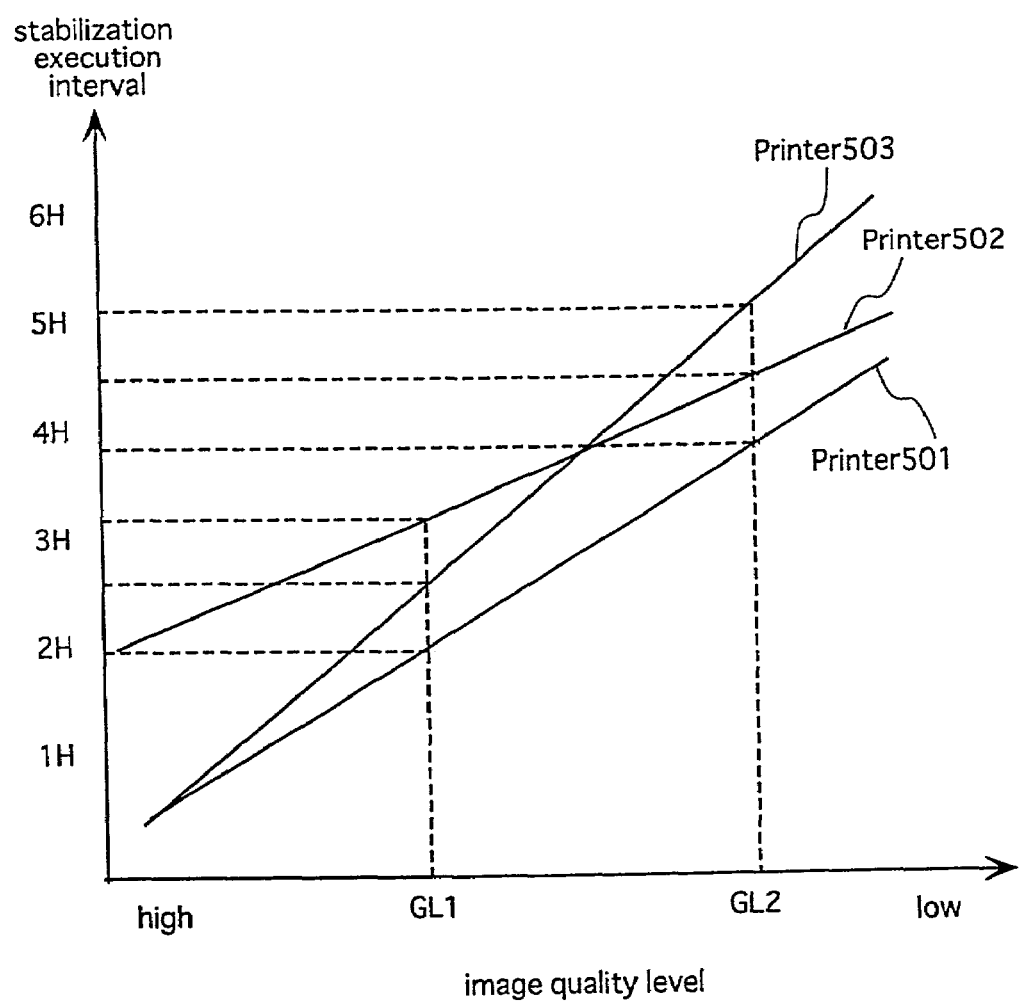
FIG. 5 is a graph of exemplary image quality attribute information relating to printers 501 to 503.

FIG. 5 is a graph of exemplary image quality attribute information relating to printers 501 to 503.

FIG. 5 shows that when the stabilization processing is conducted every two hours in printer 501, an image quality level of GL1 or better can be sustained. In other words, conducting the stabilization processing at intervals of longer than two hours will result in image quality levels falling below GL1. Thus, by conducting the stabilization processing every four hours in printer 501, the achievable image quality level will drop to GL2 or better.

The image quality attribute information for a printer is predetermined by conducting tests to measure the reduction (deterioration) in image quality under predetermined conditions of substantially continuous image forming operation. The image quality attribute information for a scanner is predetermined through similar testing. Moreover, the image quality attribute information can also show (a) the amount by which the image quality level deviates from a target image quality level for a given time period of image forming or image reading operations, or (b) the number of printed/read pages or image forming/reading operation time required for the image quality to deteriorate to a predetermined level.

As noted above, the environment variance information, apparatus parameter information, and image quality attribute information for each external apparatus in machine information table 121 (FIG. 3) correspond to the information stored in the memory of individual external apparatuses, and server 100 writes this information into machine information table 121 as it is received from the apparatuses. The information in table 121 is then referenced as required during the execution of the various processing operations.

The power-on time shows when power was turned on in an external apparatus, and is determined as the time that server 100 receives power-on information from the external apparatus. The "* *" mark in table 121 shows when the power was cut-off to an external apparatus, and is determined as the time that power-off information is received from the external apparatus.

The prior stabilization time shows when the stabilization processing was last completed, and is determined as the time that apparatus parameter information is received from an external apparatus.

The scheduled stabilization time shows when the next stabilization processing is scheduled to be conducted, and is calculated during stabilization schedule calculation processing.

The group name information shows the names of the various groups into which the external apparatuses have been assigned as a result of conducting group formation processing (described below).

FIG. 6 shows the content of the management information table 122 included in server 100.

Written into table 122 is management information for each external apparatus, and as mentioned above, includes target image quality level information and schedule information. The management information is set by the manager on manager PC 200, from where it is sent to server 100 and written into table 122.

The target image quality level information shows the minimum image quality level required by the manager with respect to the image processing conducted by each external apparatus. The target image quality level together with the image quality attribute information is used as a basis for calculating the scheduled stabilization time (i.e. the time at which the next stabilization processing is scheduled to be executed). Moreover, the target image quality level can be set arbitrarily at any level between the high and low range shown in FIG. 5.

The schedule information in FIG. 6 is applied during the execution sequence processing to determine whether priority is given to the job processing or the stabilization processing in an external apparatus. The conditions of the schedule information are based on the scheduled stabilization time and a scheduled job initiation time.

FIG. 7 shows the content of the job management table 123 included in server 100.

Written into table 123 is information relating to the jobs sent to server 100. The information is written into table 123 in the order that server 100 receives the jobs, and includes job request terminal information, image mode information, color mode information, information relating to the number of pages per original document and the number of copies of the original document required, scheduled job initiation information, scheduled job completion information, and selected apparatus information.

The job request terminal information shows the terminal apparatus that sent the job request to server 100.

The information relating to image mode, color mode, the number of pages per original, and the number of copies, is included in the print information and scan information sent from a terminal apparatus.

The scheduled job initiation and completion information shows the scheduled initiation and completion times of requested jobs, and is calculated based on such information as the number of pages in the original and the number of copied required.

The selected apparatus information shows the external apparatus selected to execute the requested job. The selection of an apparatus is conducted in the job allotment processing.

The Processing in Server 100

Figure 8:
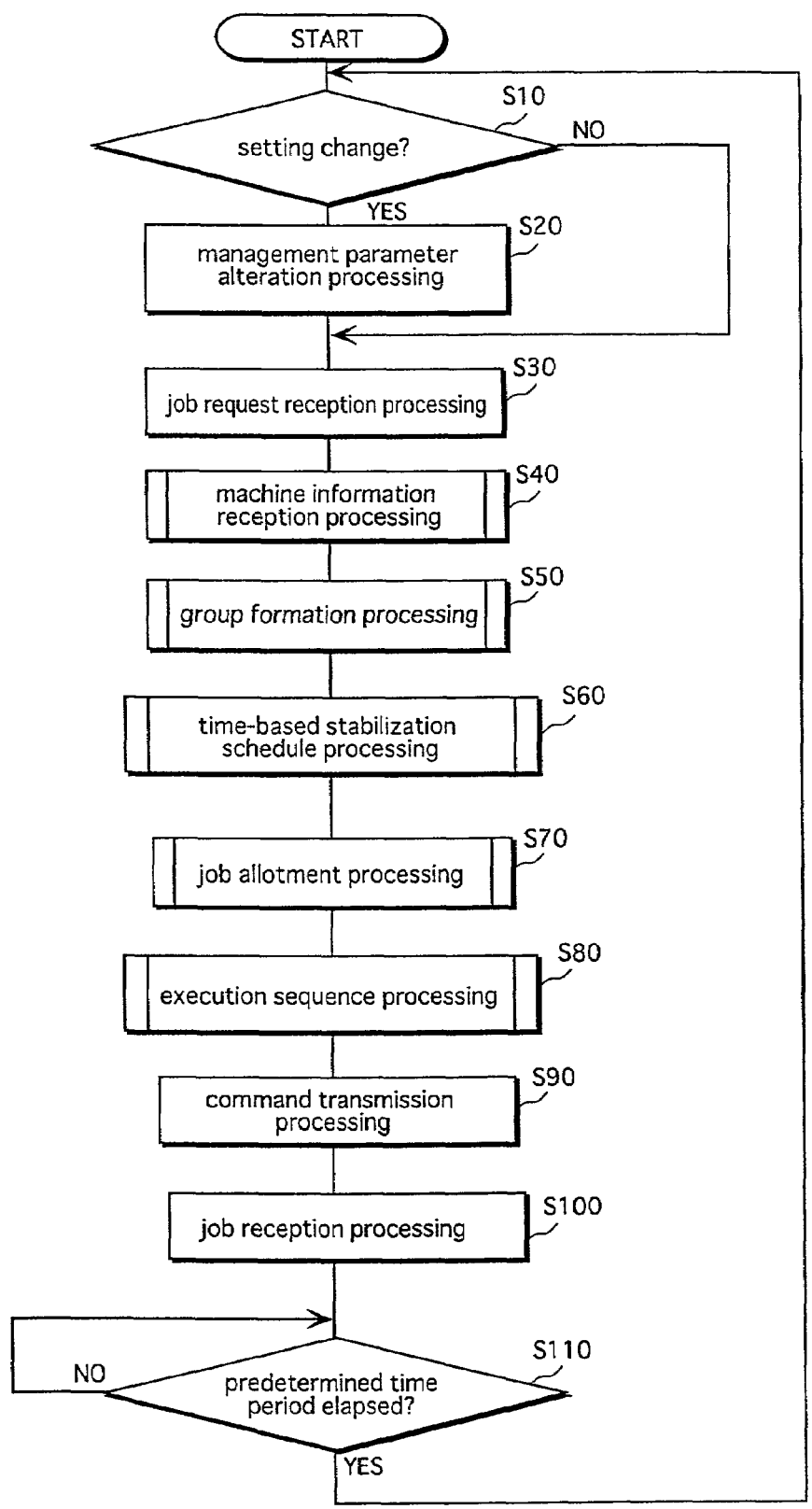
FIG. 8 is a flowchart showing the processing executed in server 100.

FIG. 8 is a flowchart showing the main routine of the processing conducted in server 100.

On receipt of a signal relating to management information from manager PC 200 (step S10="yes"), control unit 110 conducts management parameter alteration processing in order to rewrite the content of management information table 122 based on the received signal (step S20).

When no signal relating to management information is received (step S10="no"), control unit 110 proceeds to the job request reception processing (step S30).

In the job request reception processing (step S30), control unit 110 receives a job request from the terminal apparatus. As described above, the information (image mode, color mode, etc.) included in the job request is written into the appropriate columns of job management table 123 so as to correspond to the terminal apparatus that sent the request.

In the machine information reception processing (step S40), such data as environment variance information and apparatus parameter information is received from the external apparatus and written into the appropriate column in machine information table 121 so as to correspond to the external apparatus that sent the data.

In the group formation processing (step S50), the external apparatus are formed into groups in accordance with predetermined conditions.

In the time-based stabilization schedule processing (step S60), the next scheduled stabilization processing time is determined for an external apparatus.

In the job allotment processing (step S70), the optimal external apparatus for executing the received job is selected.

In the execution sequence processing (step S80), control unit 110 judges, based on the scheduled stabilization time and the scheduled job initiation time, whether to give priority of execution to the stabilization processing or the job, and alters the scheduled stabilization time in accordance with the result of the judgment.

In the command transmission processing (step S90), job execution and stabilization execution commands are sent to an external apparatus based on the information stored in tables 121, 122, and 123 in information storage unit 120.

The external apparatus executes the job on receipt of the job execution command, and conducts the stabilization processing on receipt of the stabilization execution command.

In the job reception processing (step S100), control unit 110 notifies a terminal apparatus that requested a job of (a) the name of the external apparatus selected in the job allotment processing to execute the job, and (b) information such as the scheduled initiation and completion times of the requested job.

After completing step 100, control unit 110 moves to step 110. In step 110, control unit 110 waits until a predetermined time period has elapsed and then returns to step S10 to repeat the processing of steps S10 to S110.

The processing of steps S40 to S80 will now be described in detail.

Machine Information Reception Processing

Figure 9:
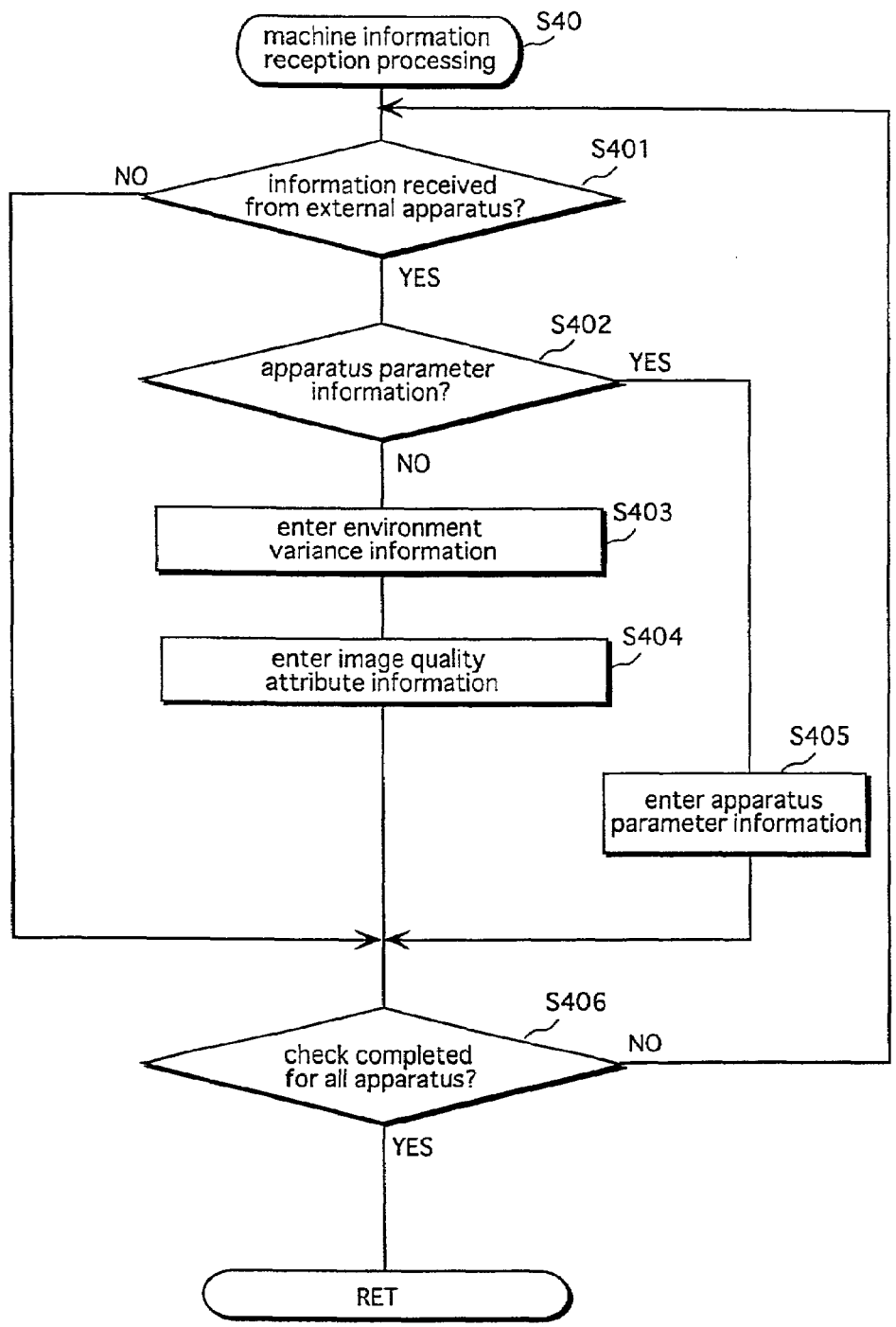
FIG. 9 is a flowchart showing a machine information reception processing subroutine.

FIG. 9 is a flowchart showing a subroutine of the machine information reception processing (step S40) in FIG. 8.

Control unit 110 firstly judges whether any information relating to environment changes, image quality attributes, apparatus parameters, power-on, or power-off has been received from any of the external apparatuses (step S401).

If judged that such information was not received (step S401="no"), control unit 110 moves to step S406. On the other hand, if judged that such information was received (step S401="yes"), control unit 110 judges whether or not the received information was apparatus parameter information (step S402). If judged that the received information was not apparatus parameter information (step S402="no"), the received information is assumed to relate to an environment change, an image quality attribute, power-on, or power-off. If the received information includes power-on information, control unit 110 writes the environment variance information and image quality attribute information sent together with the power-on information into the corresponding row and columns of machine information table 121 in steps S403 and S404, respectively. Control unit 110 also writes the data showing the reception time of the power-on information into the power-on time column in table 121 before moving on to step S406.

On the other hand, if the received information is power-off information, control unit 110 erases the environment variance information and image quality attribute information written into table 121 in steps S403 and S404, respectively, and the time data in the power-on time column before moving on to step S406.

If the received information is judged to be apparatus parameter information (step S402="yes"), then control unit 110 writes the received information into the apparatus parameter information column in table 121 (step S405), before moving on to step S406.

In step S406, control unit 110 judges whether the processing in steps S401 to S405 have been conducted for all of the external apparatus included in system 1. If "no" control unit 110 returns to step S401, and if "yes" control unit 110 returns to the main routine.

Group Formation Processing

Figure 10:
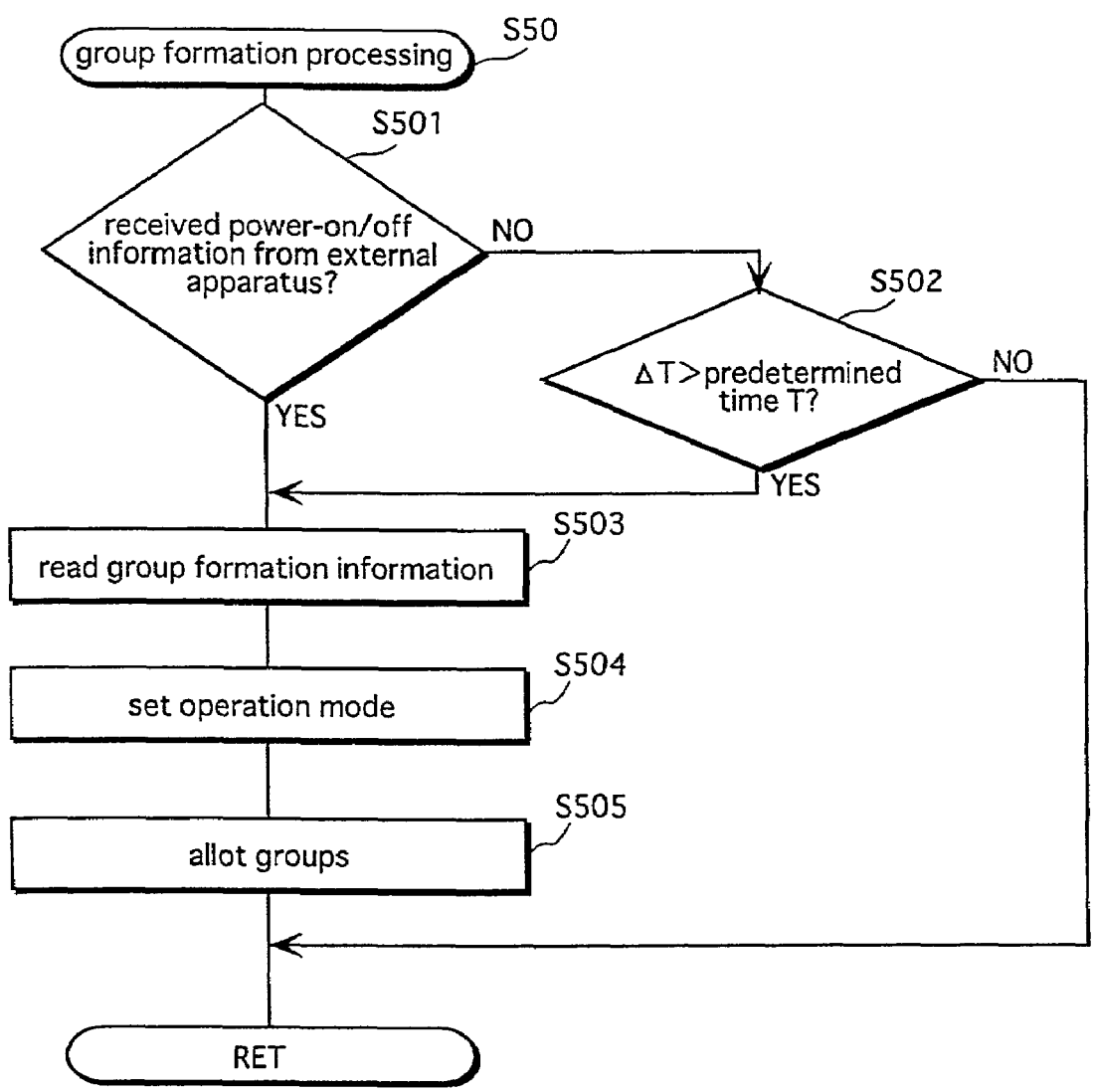
FIG. 10 is a flowchart showing a group formation processing subroutine.

FIG. 10 is a flowchart showing a subroutine of the group formation processing (step S50) in FIG. 8.

Control unit 110 firstly judges in step S501 whether power-on or power-off information was received from any of the external apparatus in the machine information reception processing (step S40) in FIG. 9.

If judged that such information was received (step S501="yes"), control unit 110 read information (environment variance information, etc.) required to conduct group formation processing from machine information table 121 into working memory 130 (step S503). Then based on the group formation information, control unit 110 conducts operation mode setting processing (step S504) and group allotment processing (step S505) before returning to the main routine.

In the operation mode setting processing (step S504), control unit 110 selects between managing the external apparatus registered in table 121 in "group mode" or "individual mode." If the group formation information is environment variance information, then when the difference in environment variance information values (i.e. environment volatility) between an arbitrary external apparatus and another external apparatus is within a predetermined range, those apparatuses can be managed in "group mode." On the other hand, when the difference in values is not within the predetermined range, the respective external apparatuses can be managed in "individual mode." This is only one method of conducting the operation mode setting processing, and alternative methods will be described in a later section.

"Group mode" involves all the external apparatus having a group formation information value within a predetermined range being treated as a group. All the apparatuses belonging to the same group are then managed in a uniform manner using the same apparatus parameter information, for example.

On the other hand, "individual mode" involves those external apparatuses having a group formation information value outside the predetermined range being managed separately using apparatus parameter information specific to the respective apparatuses, for example.

In the group allotment processing (step S505), control unit 110 allots the external apparatuses set in "group mode" in the operation mode setting processing (step S504) into smaller groups based on the value shown in the group formation information for each respective apparatus. If the group formation information is environment variance information, any external apparatuses that have an environment variation information value within a predetermined range can be managed in the "group mode" of the same group, and any apparatuses have an environment variation information value outside the predetermined range are managed in the "group mode" of another group.

Returning to FIG. 10, if judged that power-on or power-off information was not received from any of the external apparatus during the machine information reception processing (step S501="no"), control unit 110 judges whether a time period ΔT elapsed since groups were last formed exceeds a predetermined time period T (step S502). Here, the time period ΔT can be measured by timer 140 in server 100, and the predetermined time T can be set by the manager, stored in information storage unit 120, and read from unit 120 as required.

If the time period ΔT is judged to have exceeded the predetermined time T (step S502="yes"), control unit 110 executes steps S503 to S505. On the other hand, if step S502 is judged to be "no," then control unit 110 returns to the main routine.

As described above, control unit 110 executes steps S503 to S505 when the time period ΔT exceeds the predetermined time T in order to conduct the group formation processing based on the group formation information.

If the group formation information is environment variance information, the value of the information can vary depending on the number of jobs executed by an external apparatus. Thus if new groups are not formed in accordance with a current value of the environment variance information for each apparatus, the existing groups may end up including external apparatuses having very different environment volatilities.

By executing the group formation processing at regular intervals in server 100, it is possible to maintain well-balanced groups even if there are changes in the environment variance information of individual external apparatuses.

Figure 11A:
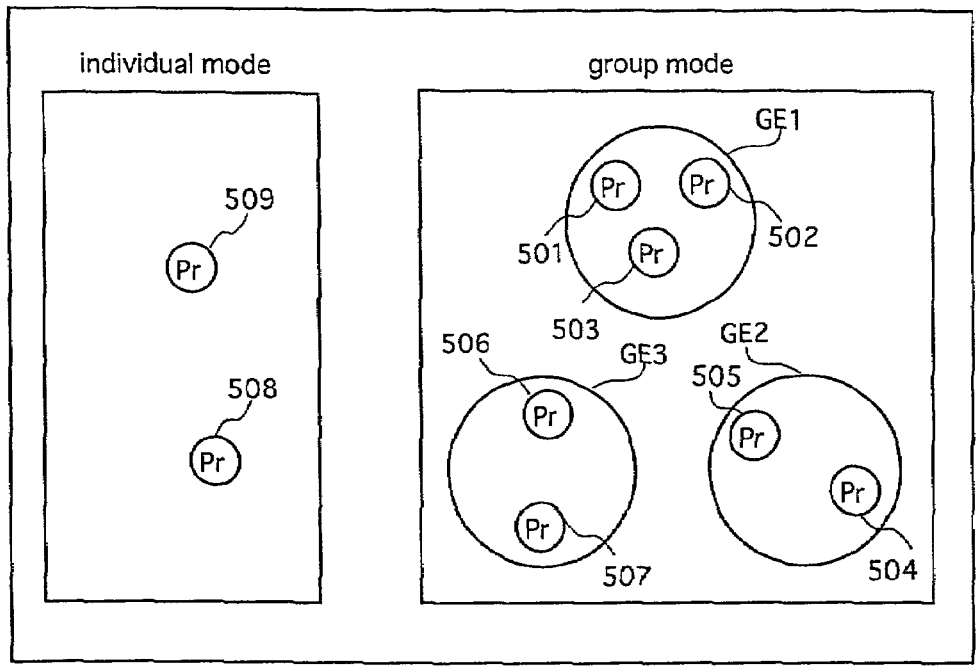
FIG. 11A shows an exemplary group formation conducted by server 100 on a plurality of external apparatuses.
Figure 11B:
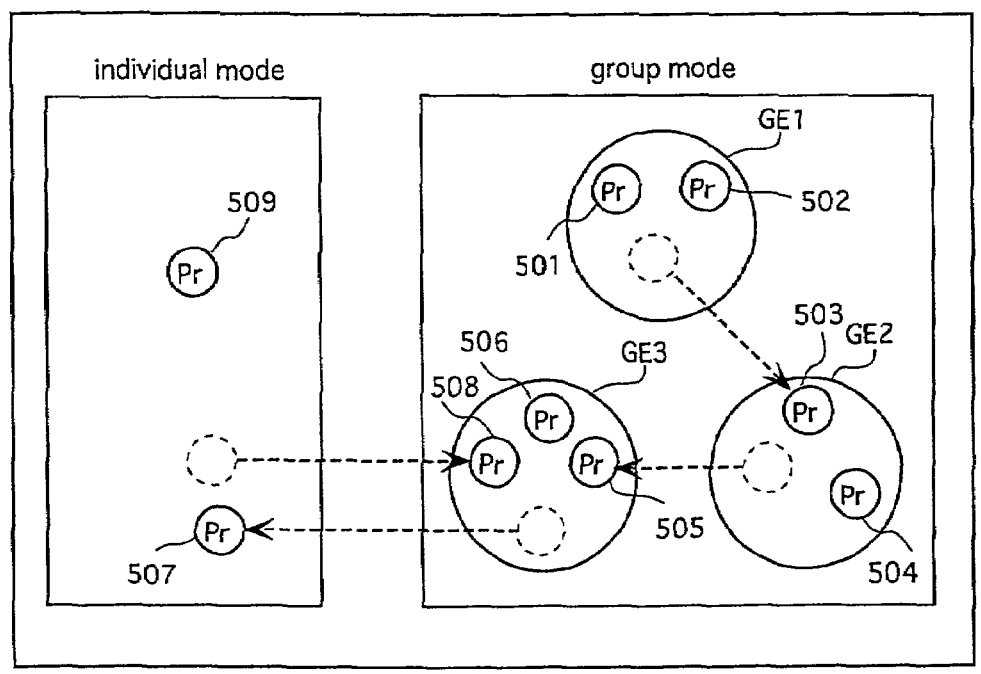
FIG. 11B shows an example of the group formation processing being executed on the group formation in FIG. 11A.

FIGS. 11A and 11B show the group formation processing executed in server 100 when based on environment variance information.

FIG. 11A shows an exemplary group formation conducted by server 100 on a plurality of external apparatuses, and FIG. 11B shows an example of the group formation processing being executed on the group formation in FIG. 11A.

In FIG. 11A, printers 501 to 507 are in "group mode" and printers 508 and 509 are in "individual mode." In addition, printers 501 to 507 are divided into groups GE1 to GE3.

The groups GE1 to GE3 each have a different value range (hereafter "group allotment range") of the environment variance information, and any external apparatuses having a value outside of the group allotment range are set to "individual mode." The external apparatuses in "group mode" are allotted to one of the groups based on their respective environment variance information.

Here, the group allotment range can be set by the manager. Furthermore, a group allotment table can be generated in which to write information relating to the range, and the table can be stored in information storage unit 120.

FIG. 12 shows an exemplary structure of the group allotment table, which contains information relating to the group allotment range.

The group allotment table contains the group allotment range set with respect to groups GE1 to GE3 using threshold values K1 to K4. As described above, the threshold values K1 to K4 can be set by the manager.

Pe in the group allotment table is the value of the environment variance information.

For the purpose for the present invention the number of groups has been set at three, although it is of course possible to have a different number of groups, say, four or more groups, for instance. Moreover, it is possible for the threshold values K1 to K4 to be varied in accordance with the operating condition of the external apparatus or the state of the group formation processing in server 100, for example.

In FIG. 11B, external apparatuses whose environment variance information has changed (printers 503, 505, 507, and 508 in the given example) since the group formation processing shown in FIG. 11A was executed, are set at different operation modes and allotted to different groups when the group formation processing is executed after a predetermined time period on the group formation shown in FIG. 11A.

As described above, server 100 executes the group formation processing in which the external apparatuses having, for example, environment variance information of a similar value are treated as one group, and the external apparatuses formed into the same group are managed by server 100 in a uniform manner. It is this uniform management of external apparatuses belonging to the same group that makes possible the sharing of apparatus parameter information in the time-based stabilization schedule processing that will now be described.

Time-based Stabilization Schedule Processing

Figure 13:
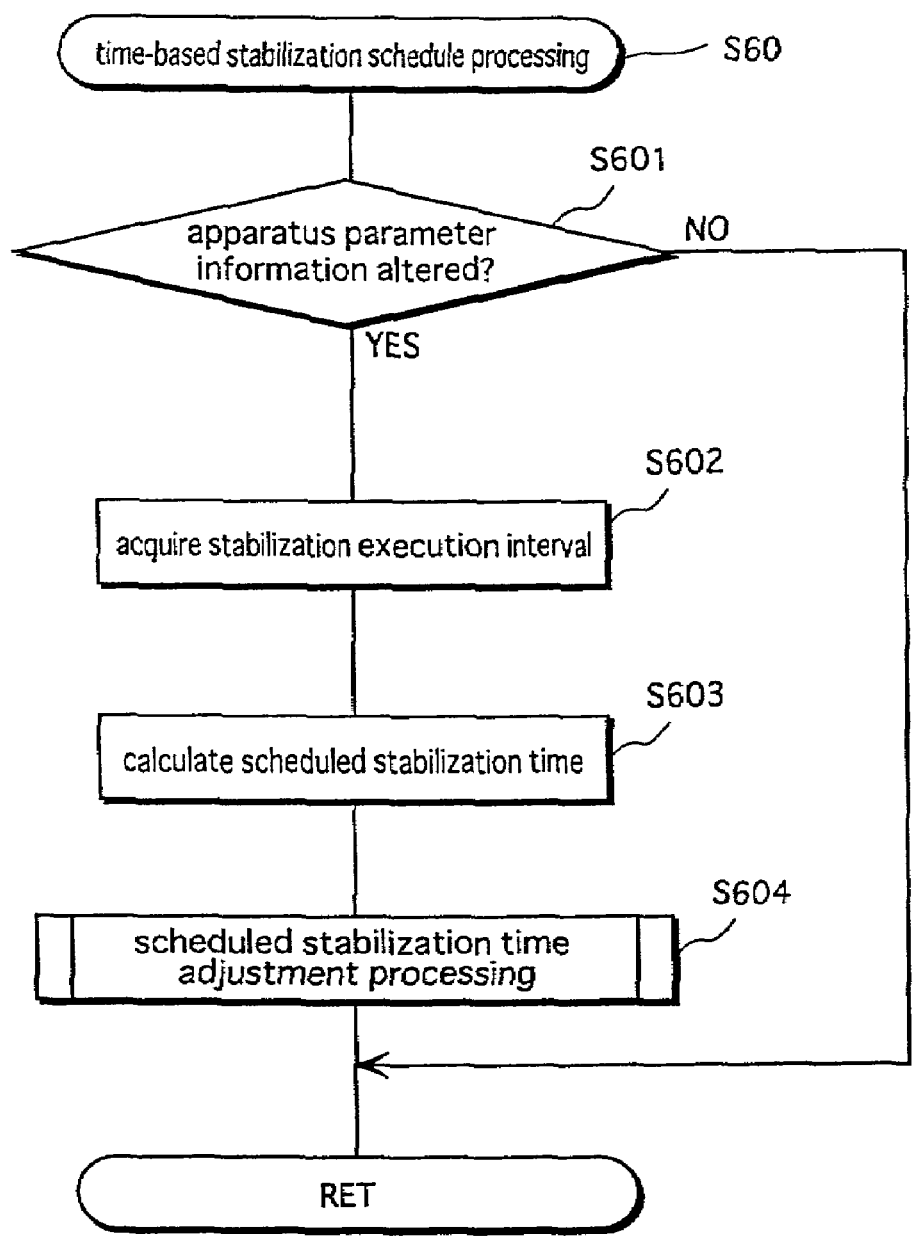
FIG. 13 is a flowchart showing a time-based stabilization schedule processing subroutine.

FIG. 13 is a flowchart showing a subroutine of the time-based stabilization schedule processing (step S60) in FIG. 8.

Control unit 110 firstly judges whether there has been a change to the apparatus parameter information (step S601). This judgment is conducted based on whether there was an entry of apparatus parameter information in step S405 of the machine information reception processing (FIG. 9).

If judged that there has been a change in the apparatus parameter information (step S601="yes"), control unit 110 executes processing to acquire a stabilization execution interval for the external apparatus to which the change relates (step S602).

In this processing, the interval at which the stabilization processing is executed in an external apparatus is determined based on the image quality attribute information written into machine information table 121 and the target image quality level written into management information table 122.

Taking printer 501 as an example, if the target image quality level is set by the manager to correspond to GL1 in FIG. 5, the interval at which the stabilization processing is executed in printer 501 is determined from the image quality attribute information to be two hours. Likewise, if the target image quality level of printer 503 is set so as to correspond to GL2, the determined execution interval is five hours.

Next, control unit 110 executes processing to calculate the scheduled stabilization time (step S603). In this processing, the prior execution time of the stabilization processing for an external apparatus is read from the prior stabilization time information written into machine information table 121, and the read time is added to the execution interval of the stabilization processing determined in step S602, and the resultant time is computed to be the next scheduled stabilization time. Taking printer 501 as an example once more, if the prior stabilization time was 10:20 am and the target image quality level is set at GL1, the scheduled stabilization time is computed as 12:20 pm given an execution interval of two hours.

The information showing the computed next scheduled stabilization time for the external apparatus is written into the corresponding row of the "scheduled stabilization time" column in machine information table 121. Although the execution interval is described above as being simply a period of time, it can alternatively be calculated in terms of the period of operating time actually spent executing image processing (e.g. image forming operations, etc.) in an external apparatus. In this case, if the execution interval of a printer is determined to be two hours, an execution command to execute the stabilization processing can be sent to the printer when the accumulated print output operation time of the printer equals two hours.

When the time computed as the scheduled stabilization time is reached in an external apparatus, control unit 110 sends an execution command to the external apparatus to execute the stabilization processing.

As described above, a stabilization execution interval corresponding to a target image quality level set by the manager is determined based on the image quality attribute information of an external apparatus. By having the external apparatus execute the stabilization processing in accordance with the determined interval, the manager is effectively able to adjust the image quality of image processing executed in the external apparatus. For example, if printer 501 is used to output photographic pictures requiring a high quality level, the manager can set the target image quality level for printer 501 to a high level. In comparison, if printer 502 is used to output text images requiring a comparatively lower quality level, the manager can set the target image quality level for printer 502 to a lower level. It is thus possible to achieve an image quality level of a desired level or better in both printers.

Additionally, if the target image quality level is set to a low level, the interval between executions of the stabilization processing can be lengthened, thereby reducing the frequency at which the stabilization processing is executed and allowing for power savings to be made with respect to the stabilization processing. Thus it becomes possible to solve the problem of wasted power usage occurring in known systems in which a manager is not able to manage the printers in the system because of the stabilization processing being conducted independently in each printer in order to maintain a high image quality level, this being in spite of the fact that the manager may have been prepared to accept lower image quality levels of print output.

Having completed calculating the scheduled stabilization time (step S603), control unit 110 then moves on to conduct scheduled stabilization time adjustment processing (step S604). This processing is conducted on the external apparatuses in the groups formed in the group formation processing.

Figure 14:
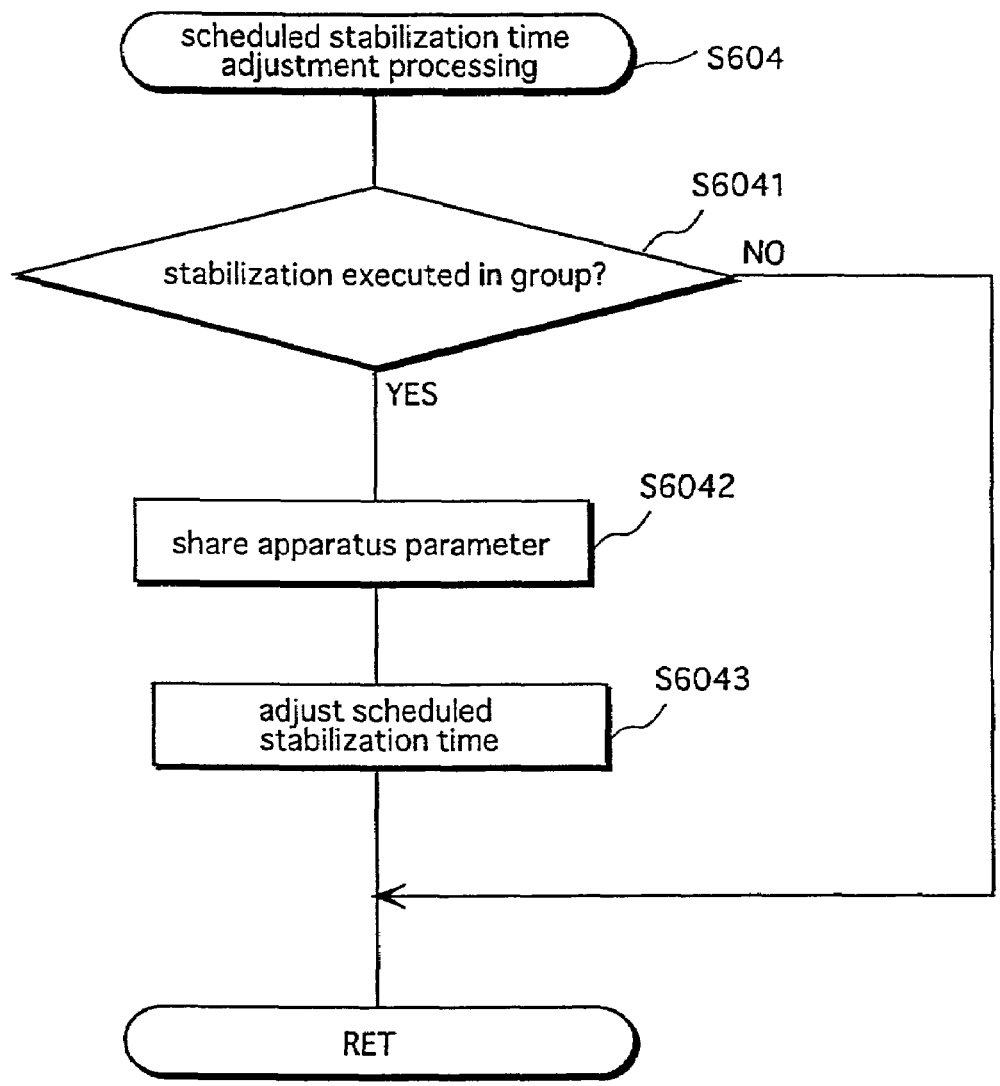
FIG. 14 is a flowchart showing a scheduled stabilization time adjustment processing subroutine.
Figure 15:
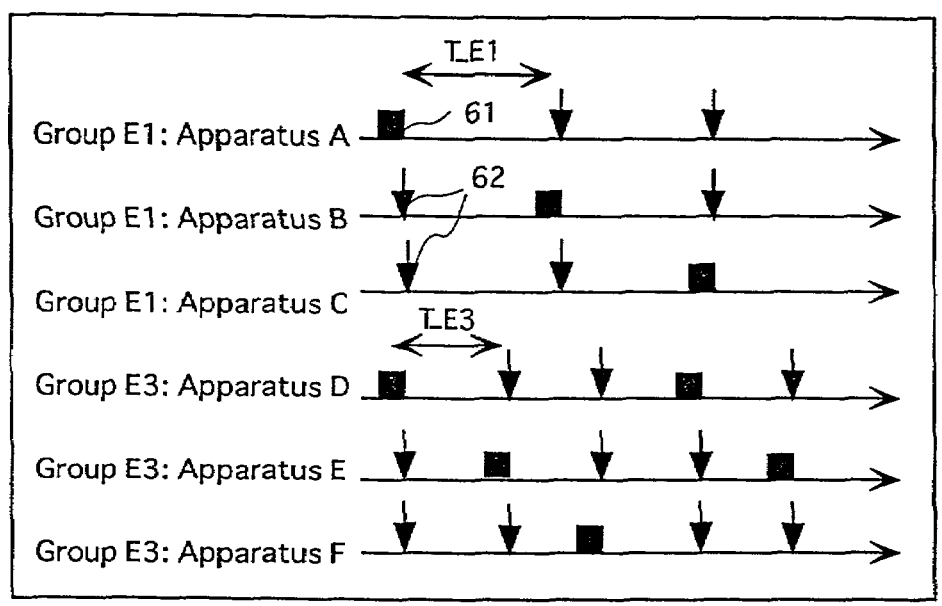
FIG. 15 is a schematic diagram showing scheduled stabilization time adjustment processing and image quality stabilization processing being executed with respect to six external apparatus A to F, that have been formed into two groups E1 and E3 in the group formation processing, the stabilization processing being executed in the order A, B, C with respect to group E1, and D, E, F with respect to group E3.

FIG. 14 is a flowchart showing a subroutine of the scheduled stabilization time adjustment processing. FIG. 15 is a schematic diagram showing scheduled stabilization time adjustment processing and stabilization processing being executed with respect to six external apparatus (A to F, in the given example) that have been formed into two groups E1 and E3 in the group formation processing, the stabilization processing being executed in the order A, B, C with respect to group E1, and D, E, F with respect to group E3. The black squares in FIG. 15 represent the execution of the stabilization processing.

For ease of understanding, the scheduled stabilization time adjustment processing operation included as part of the time-based stabilization schedule processing (FIG. 13) will be described in relation to apparatus A in group E1, given that apparatus A has executed the stabilization processing and the apparatus parameter information has been changed.

In FIG. 14, control unit 110 firstly judges whether any of the external apparatuses in the same group have executed stabilization processing (step S6041). In the given example, apparatus A has executed the stabilization processing (marked by black square 61 in FIG. 15). Control unit 110 thus judges that stabilization has been executed in the group (step S6041="yes"), receives the apparatus parameter information for apparatus A, and sends the apparatus parameters (i.e. the optimal adjustment values of the developing bias voltage, etc., determined as a result of the execution of the stabilization processing) shown in the received information to the other apparatuses in the group (i.e. apparatuses B and C) together with an instruction to write the apparatus A parameters into their respective memories as new apparatus parameters (step S6042). In this way, apparatuses B and C share the optimal adjustment values of apparatus A, which has executed the stabilization. In should be noted that in case of a plurality of apparatuses having executed the stabilization processing, the apparatus having the earliest prior execution time is selected. The arrow 62 in FIG. 15 represents the apparatus parameters of apparatuses B and C being rewritten to the changed optimal adjustment values of apparatus A.

An external apparatus controls the control variables of the various internal elements (e.g. developing bias voltage of the developing unit, etc.) in accordance with the optimal adjustment values stored in its memory. This effectively means that apparatuses belonging to the same group will execute controls based on the same optimal adjustment values.

Thus by sharing the optimal adjustment values of one apparatus (e.g. apparatus A) with the other apparatuses in the group, the other apparatuses (e.g. apparatuses B and C) are able to acquire the optimal adjustment values without having to execute the stabilization processing. Acquiring the optimal adjustment values of the developing bias voltage for apparatus A means that apparatuses B and C are not required to generate a plurality of toner patterns of differing densities on the surface of the photosensitive drum in order to determine an optimal adjustment value of the developing bias voltage, for example.

Thus in comparison to known structures in which each of the external apparatuses independently conducts stabilization processing, the structure of the present embodiment allows for power usage to be reduced by an amount equal to the reduction in the number of stabilization processing operations executed within the same group of external apparatus. The reduction in the frequency with which the stabilization processing is executed also means that less time is wasted interrupting the image forming and image reading operations, which translates into increased time available for executing jobs. Moreover, time is no longer wasted waiting for a request job to be executed while a plurality of external apparatuses having the same optimal adjustment values execute the stabilization processing at substantially the same time. Thus system 1 as described above is able to realize efficiency increases in the execution of jobs as well as overall performance improvements.

In order to have the external apparatuses in the same group (e.g. apparatuses A to C) execute the stabilization processing in order, control unit 110 adjusts the scheduled stabilization time of each apparatus (step S6043).

The reason for rotating the stabilization processing operation among the external apparatus in the group is as follows. Depending on the size of the group allotment range determined using threshold values K1 to K4, there will be within the one group, apparatus having substantially the same or similar environment variance information, for example. Repeated sharing of apparatus parameters based on the stabilization processing executed by the same apparatus in the group means that the other apparatuses in the group must always execute controls based on the apparatus parameters of a similar but nevertheless slightly different apparatus. In this case, the shared apparatus parameters of one apparatus are not necessarily going to match exactly the apparatus parameters that would be obtained from another apparatus executing the stabilization processing itself. These slight differences mean that the optimal apparatus parameters are not being achieved, which may have an affect on the image quality of image processing. Consequently, by rotating the execution of the stabilization processing among the external apparatuses in the same group (here, a strictly maintained order is not always necessary), the frequency with which one apparatus in the group executes the stabilization processing is reduced, allowing for the prevention of less than optimal image quality conditions with respect to individual apparatuses, and an overall improvement and stabilization of image quality in the group as a whole.

One possible method of rewriting the scheduled stabilization time of an external apparatus in a group involves determining the shortest of the stabilization execution intervals (e.g. TE1 in FIG. 15) acquired for each of the apparatus in step S602 as the interval for all the apparatuses, and having the apparatuses execute the stabilization processing based on the determined interval. This allows for the stabilization processing to be executed in turn by each of the apparatuses in the same group while at the same time maintaining an image quality level of at least as high if not higher than the target level set by the manager.

The sharing of apparatus parameters in step S6042 and the altering of the scheduled stabilization time in step S6043 derive the same effect when executed with respect to apparatuses D to F in group E3.

Job Allotment Processing

Figure 16:
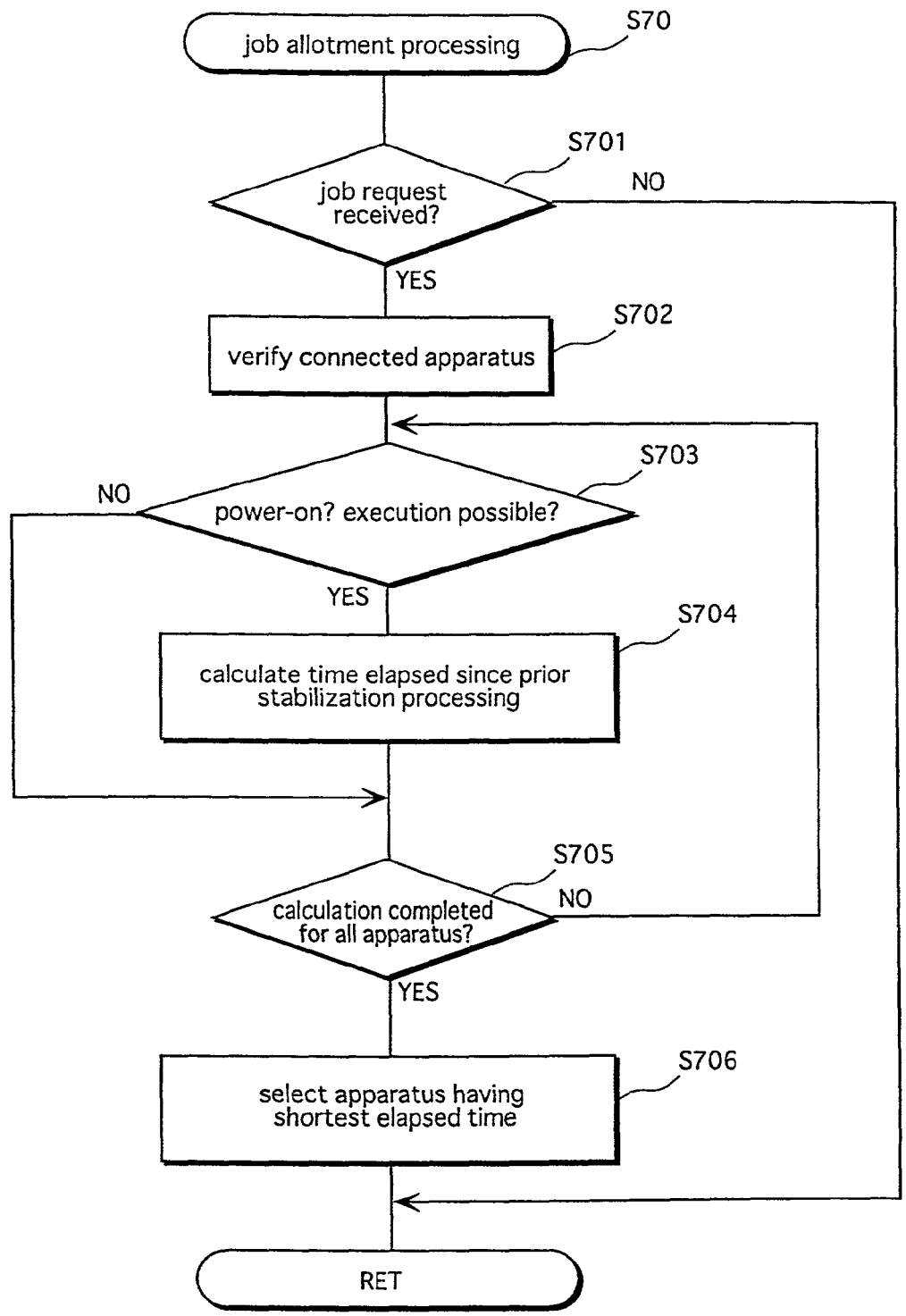
FIG. 16 is a flowchart showing a job allotment processing subroutine.

FIG. 16 is a flowchart showing a subroutine of the job allotment processing (step S70) in FIG. 8.

Control unit 110 firstly judges whether a job has been requested (step S701). This judgment is based on the judgment conducted in the job request reception processing (step S30).

If judged that a job has been requested (step S701="yes"), control unit 110 verifies as the apparatus group, all of the printers in printer group 500 when the job is a request to execute print processing, and all of the scanners in scanner group 400 when the job is a request to execute reading processing (step S702).

Control unit 110 then judges with respect to one of the external apparatuses in the verified apparatus group, whether the power is "on" and whether execution of the job is possible (step S703). In order to conduct these judgments, control unit 110 refers to the power-on time column of the row in machine information table 121 corresponding to the apparatus, and if power is judged to be "on," control unit 110 then refers to job management table 123, and if judged that the apparatus is not scheduled to execute another job and is not currently executing a job (i.e. the present time not within scheduled job initiation and job completion times in table 123), control unit 110 judges the apparatus to be able to execute the requested job.

If judged that the apparatus is able to execute the requested job (step S703="yes"), control unit 110 reads the information showing the prior stabilization time (i.e. the time at which the stabilization processing was last completed) from the machine information table 121 of the apparatus, calculates in step S704 the amount of time that has elapsed (hereafter "elapsed time") since the stabilization processing was last completed (i.e. difference between the present time and prior stabilization time), and temporarily stores the information showing the calculated elapsed time in working memory 130 as information relating to an execution condition of the image quality stabilization processing in the apparatus.

If the apparatus in the group selected by control unit 110 is judged not to be in a power-on state or not able to execute the job, (step S703="no"), control unit 110 moves to step S705.

In step S705, control unit 110 judges whether the processing in steps S703 and S704 has been conducted for all of the external apparatus in the verified apparatus group, and if "no," control unit 110 returns to step S703.

If the processing in steps S703 and S704 is judged to have been completed for all of the apparatus (step S705="yes"), control unit 110 acquires from working memory 130 the information showing the elapsed time for each apparatus, compares the acquired elapsed times, selects the apparatus having the shortest elapsed time as the apparatus to execute the requested job (step S706), and returns to the main routine.

Control unit 110 writes the information identifying the selected apparatus into the selected apparatus information column in the row of management table 123 corresponding to the requested job.

Selecting the apparatus having the shortest elapsed time in the group means that the apparatus most likely to execute the requested job at the highest image quality level is selected. Put simply, because of reductions in the achievable image quality of print output with increases in operating time, the apparatus having the shortest amount of time elapsed since the stabilization processing was last completed should accordingly have suffered the least deterioration in achievable image quality of print output. Thus the selection of this apparatus to execute the requested job will allow for the job to be executed at a high image quality level.

Figure 17:
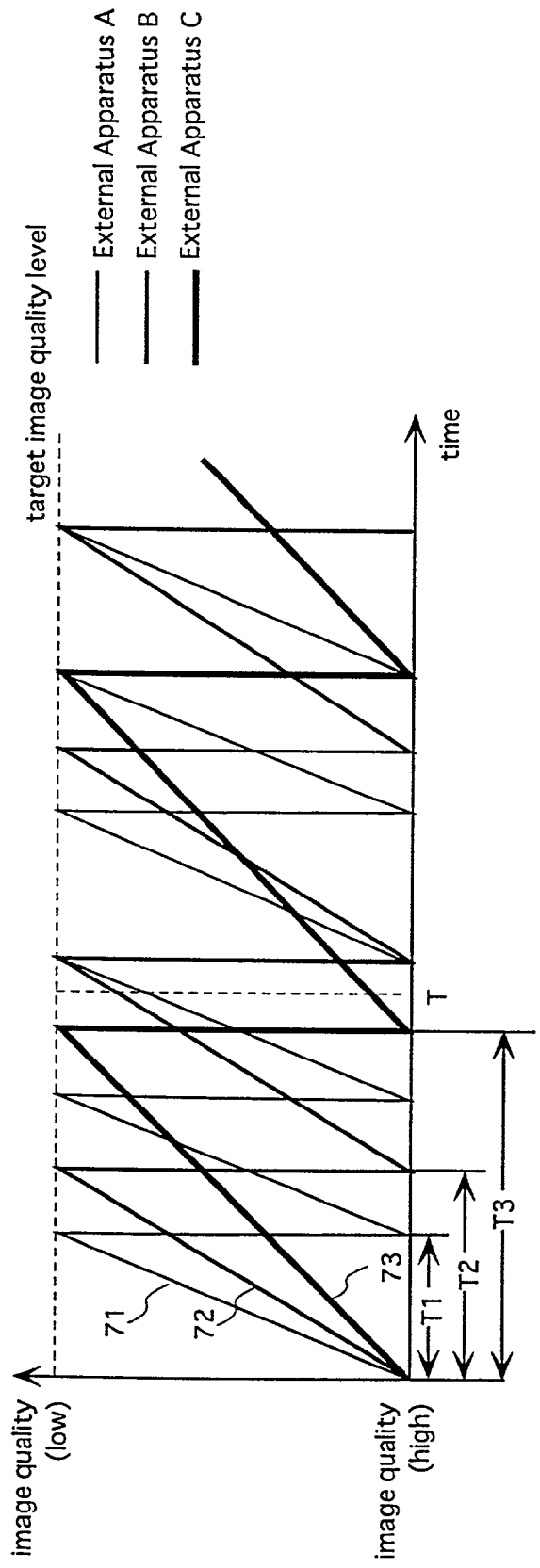
FIG. 17 is a schematic diagram showing the relationship between operation time and image quality in three arbitrary external apparatuses.

FIG. 17 is a schematic diagram showing the relationship between operation time and image quality with respect to three external apparatuses A, B, and C. The zigzag lines 71 to 73 represent the variance in image quality for apparatuses A, B, and C, respectively. Intervals T1, T2, and T3 represent the stabilization execution intervals for apparatuses A, B, and C, respectively. Zigzag lines 71 to 73 show a cycle according to which image quality suffers reductions over time, until the respective target image quality level is reached, at which point the stabilization processing is executed and the image quality is returned to a high level.

If a job is to be executed at T by one of apparatuses A, B, and C having the characteristics described above, then selection of the apparatus having the shortest elapsed time since the stabilization processing was last conducted (i.e. apparatus C) would be expected to yield the highest image quality of print output.

As described above, in the case that a plurality of external apparatuses is capable of executing the job, the job allotment processing according to the present embodiment results in the selection of the apparatus capable of the highest image quality of print output. System 1 thus achieves a convenient and user-friendly image processing system according to which it is possible to prevent the inconvenience occurring in known systems whereby the possibility of an inappropriate image quality print output is increased because of the apparatus for executing a job being selected without knowing the achievable image quality levels of each apparatus in the system.

In the job allotment processing as described above, the elapsed time is acquired as the information relating to the execution condition of the stabilization processing of an external apparatus, and the apparatus having the shortest elapsed time is selected as the apparatus to execute the job. However, it is possible to acquire the information showing the time period from the present time to the next scheduled stabilization time, and select the apparatus having the longest time period as the apparatus to execute the job. In this case, the same effect can be achieved as when the apparatus having the shortest elapsed time is selected, since the apparatus having the longest time period until the scheduled stabilization processing is effectively the apparatus having the shortest elapsed time since the stabilization processing was last executed.

The scheduled stabilization time for each apparatus can be determined by referring to machine information table 121, and the time period until the scheduled stabilization time readily obtained by calculating the difference between the present time and the scheduled stabilization time.

In the job allotment processing as described above, control unit 110 judges whether one of the external apparatuses in a verified apparatus group is capable of executing the requested job, and judges "yes" if no jobs are scheduled for or currently being executed by the apparatus. However, even if the apparatus is currently executing another job, it can still be selected to execute the requested job if the elapsed time from when the stabilization processing was last conducted until the scheduled completion of the current job is judged to be shorter than the same time period for the other apparatuses in the group. If an apparatus currently executing a job is selected to execute the requested job, the initiation time of the request job will be delayed while waiting for the apparatus to finish executing the current job. However, the benefit is that the apparatus capable of achieving the highest image quality of print output is selected to execute the requested job. In this case, the elapsed time is calculated from the prior stabilization time of each apparatus until the scheduled completion time (i.e. instead of the present time) of the other job currently being executed, and the apparatus having the shorted elapsed time is selected to execute the requested job. This processing can also be structured such that the apparatus having the longest time period from the scheduled completion time of the current job until a scheduled stabilization time can be selected to execute the requested job.

Also, if the elapsed times of all the apparatuses in the group are acquired and the apparatus showing the shortest elapsed time is currently executing a job, it is possible to select this apparatus if judged that the other apparatuses in the group are only capable of producing a low quality of print output.

Although the present embodiment was described above in terms of server 100 computing the elapsed time for each external apparatus, it is possible for each external apparatus to calculate their own respective elapsed time and send information showing the calculated elapsed time to server 100. In this case, server 100 sends a request to each external apparatus to send the elapsed time. On receipt of the request, each external apparatus calculates the time elapsed since the stabilization processing was last conducted until the present time and sends the calculated elapsed time to server 100. After acquiring the elapsed time for each apparatus as the information showing the current condition of the stabilization processing, server 100 selects the apparatus having the shortest elapsed time to execute the requested job. Alternatively, the apparatus having the longest time period from the present time until the scheduled stabilization time can be selected.

Execution Sequence Processing

Figure 18:
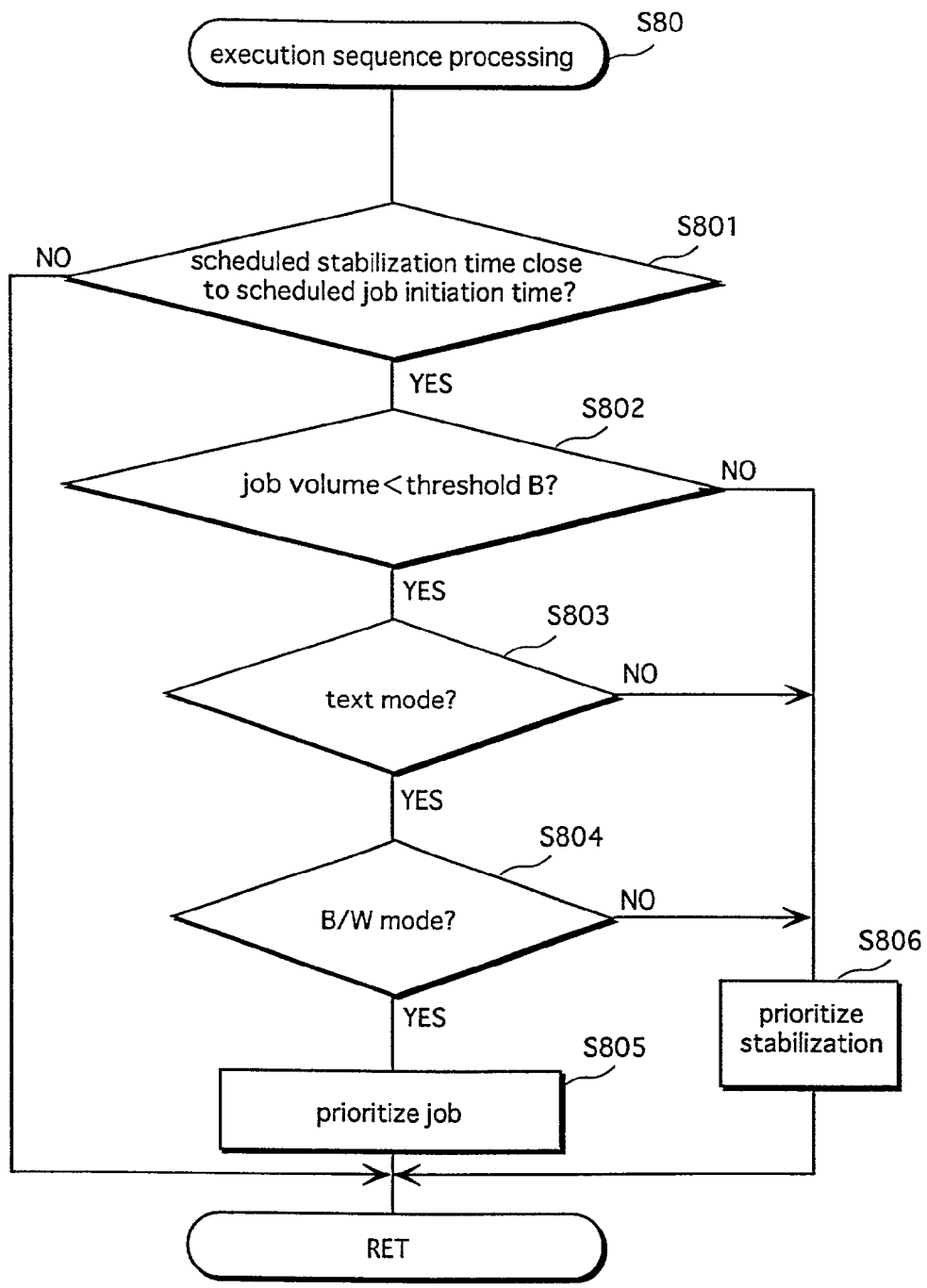
FIG. 18 is a flowchart showing an execution sequence processing subroutine.

FIG. 18 is a flowchart showing a subroutine of the execution sequence processing (step S80) in FIG. 8.

In the execution sequence processing, control unit 110 firstly judges whether the next stabilization processing is scheduled close to the next job execution in an external apparatus (step S801). This judgment is based on the scheduled stabilization time written into machine information table 121 and the scheduled job initiation time written into job management table 123. Referring to the information in tables 121 and 123, control unit 110 judges whether the difference between the two times is less than a threshold value A. Threshold value A can be written into the management information table 122 by the manager, and can be set in a range of approximately five to ten minutes, for example.

If judged that scheduled stabilization processing is close to a job execution (step S801="yes"), control unit 110 then judges whether the job volume is less than a threshold value B (step S802). Here, "job volume" refers to the number of pages to undergo print processing in the case of a printer, and the number of pages to undergo reading processing in the case of a scanner. Like threshold A, threshold B can be written into the management information table 122 by the manager, and can be set in a range of approximately 10±5 pages, for example.

Of course the values of thresholds A and B are not limited to the values given above and can be set as required according to the state of system 1.

In the present embodiment the value of the thresholds are set and written into management information table 122 by the manager, although it is possible to have the server determine these values depending on the operation condition of each apparatus, and then write the determined values into management information table 122.

If the job volume is judged to be less than threshold B (step S802="yes"), control unit 110 refers to job management table 123 in order to judge whether the image mode of the job is without interruption text mode (step S803). If judged to be text mode (step S803="yes"), control unit 110 judges whether the color mode is monochrome (step804), and if "yes," control unit 110 conducts job priority processing (step S805), and returns to the main routine in FIG. 8.

In the job priority processing, the stabilization processing in an apparatus is conducted after the execution of the requested job, and the next scheduled stabilization time is adjusted so that the job and the stabilization processing are executed consecutively without interruption. Executing the job and the stabilization processing operations consecutively removes the need repeat various pre-processing and post-processing operations such as reheating the heater in the heat fixing unit and restarting the various motors.

On the other hand, if judged that the job volume is equal to or greater than threshold B (step S802="no"), or not in text mode (i.e. photo; step S803="no"), or not in monochrome (i.e. color; step S804="no"), control unit 110 executes stabilization priority processing (step S806), and returns to the main routine.

Stabilization priority processing is the reverse of job priority processing and involves the stabilization processing in an external apparatus being conducted prior to the execution of the requested job, and the adjustment of the scheduled stabilization time so that the stabilization processing and the job are executed consecutively without interruption.

As described above, when the scheduled stabilization processing is judged to be close to a scheduled job, server 100 judges whether to give priority to the job execution or the stabilization processing based on the job volume, image mode, and color mode, and alters the scheduled stabilization time in accordance with the judgment results. It is thus possible to improve the overall processing efficiency of the jobs while at the same time maintaining an image quality level of at least the target image quality level if not better.

By altering the scheduled stabilization time so that the stabilization processing and the job are executed consecutively without interruption in the job priority processing and the stabilization priority processing, it is possible to realize reductions in power usage as a result of conducting the pre-processing and post-processing jointly instead of individually, as is the case when the stabilization processing and job are not executed consecutively.

FIG. 19 shows, as an example of job priority processing and stabilization priority processing, the stabilization processing and job being executed separately in an arbitrary printer in printer group 500.

Figure 19A:
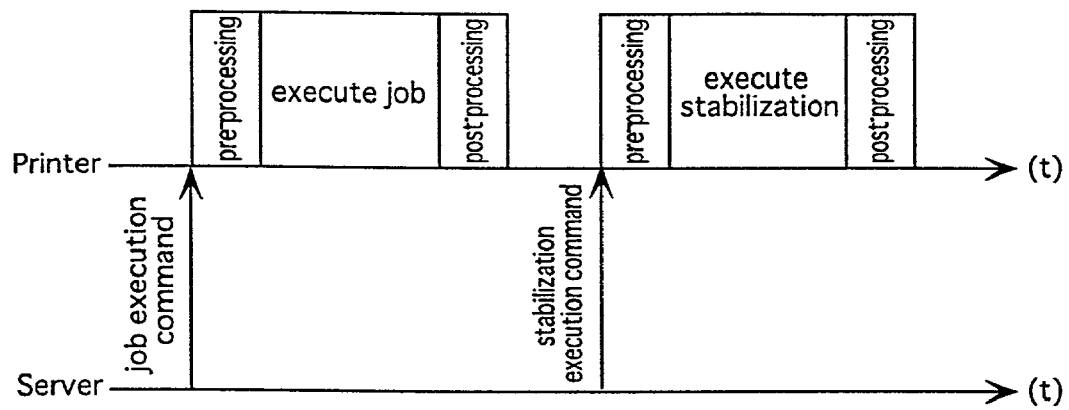
FIG. 19A shows an example of the image quality stabilization processing being conducted after executing a job.
Figure 19B:
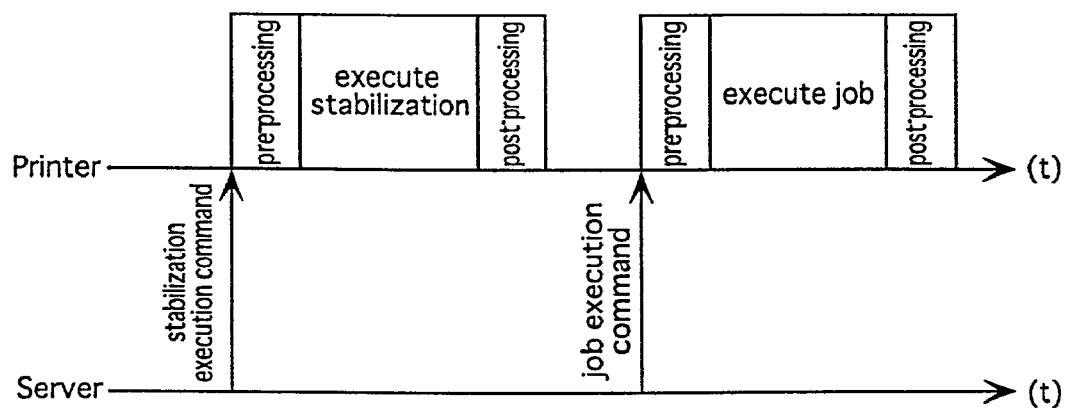
FIG. 19B shows an example of the image quality stabilization processing being conducted prior to he job being executed.

FIG. 19A shows an example of the stabilization processing being executed after the job execution, and FIG. 19B shows an example of the stabilization processing being executed prior to the job execution. Time is marked on the horizontal axis of both diagrams.

As shown in the FIGS. 19A and 19B, when the printer executes the stabilization processing and the job in accordance with an instruction from server 100, various pre-processing and post-processing operations are required.

When a print job is conducted in printer, for instance, the pre-processing involves operations such as rotating the photosensitive drum at a predetermined speed so that the drum is idling, and the post-processing involves such operations as cleaning the photosensitive drum.

Much of the pre and post-processing required for stabilization processing is the same as that required for a job, and as shown in FIG. 20, it is possible to reduce the number of pre and post-processing operations to one time each by having the stabilization processing and job executed consecutively.

FIG. 20 shows as an example of the stabilization processing and job being executed consecutively without interruption in an arbitrary printer in printer group 500.

Figure 20A:
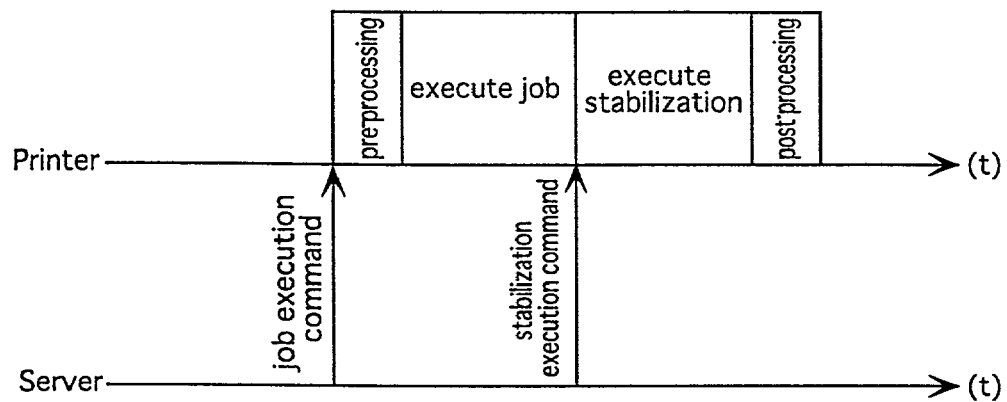
FIG. 20A shows an example of the image quality stabilization processing being conducted after executing a print job.
Figure 20B:
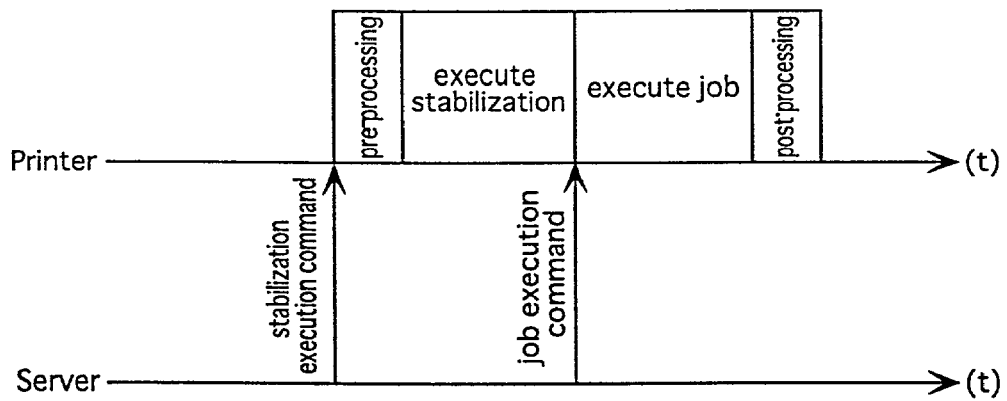
FIG. 20B shows an example of the image quality stabilization processing being conducted prior to the print job being executed.

FIG. 20A shows an example of the stabilization processing being executed after the job execution, and FIG. 20B shows an example of the stabilization processing being executed prior to the job execution.

As shown in FIG. 20A, an instruction from server 100 to execute the stabilization processing is received by the printer to coincide with the completion of the print job, which allows the stabilization processing to be initiated without conducting the post-processing for the print job. Likewise, because the printer was executing a print job up until immediately before the stabilization processing was initiated, there is no need to conduct the pre-processing operations for the stabilization processing.

In the case that the stabilization processing is executed prior to the job as shown in FIG. 20B, it is possible to eliminate the post-processing for the stabilization processing and the pre-processing for the print job.

By altering the scheduled stabilization time so that the stabilization processing and print job are executed consecutively without interruption in the stabilization priority processing and the job priority processing of the execution sequence processing, server 100 is able to eliminate one of either the pre or post-processing operations for the stabilization processing and print job, thus realizing reduction in power usage related to the execution the pre and post-processing operations.

As described above in relation to the present embodiment, a printer executes processing (i.e. image forming processing or stabilization processing) as soon as instructed to do so by server 100. However, if the printer is currently executing processing, it is possible to delay the execution of the instructed processing until the current processing has been completed. Thus, if the printer is currently executing image forming processing and receives an instruction to execute stabilization processing, the printer can store the instruction content in memory, read the instruction when the print job has been completed, and conduct the stabilization processing in accordance with the instruction.

Although the present embodiment has been explained in relation to a printer, the same effect can be obtained from conducting the processing described above with respect to a scanner.

The Processing Executed in an External Apparatus

Figure 21:
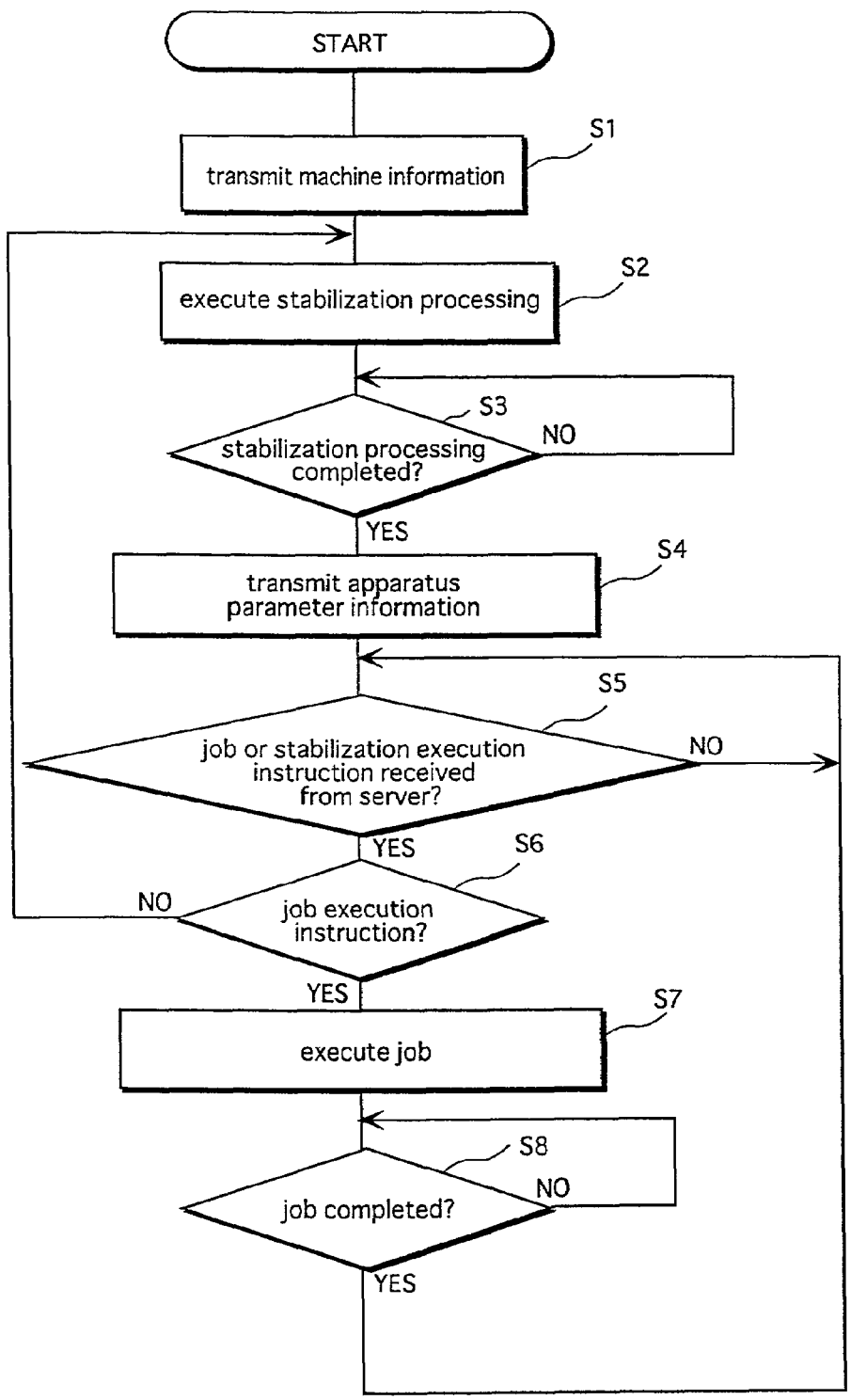
FIG. 21 is a flowchart of the processing conducted in each external apparatus after power has been supplied.

FIG. 21 is a flowchart of the various processing operations conducted in an external apparatus once power has been supplied.

When power is supplied, an external apparatus executes machine information transmission processing, according to which both power-on information showing that power has been supplied and machine information stored in the apparatus are sent to server 100 (step S1). Next, the apparatus executes stabilization processing (step S2), and when this has been completed (step S3="yes"), the apparatus sends to server 100 apparatus parameter information obtained as a result of executing the stabilization processing (step S4). The apparatus then waits for an execution instruction from server 100 relating to a job or a stabilization processing operation (step S5).

If it is judged that an execution instruction has been received (step S5="yes"), the apparatus judges whether the received instruction is a job execution instruction (step S6). If "yes" the apparatus executes the job in accordance with the instruction (step S7). When execution of the job has been completed (step S8="yes"), the apparatus returns to step S5 and waits again for an instruction from server 100.

On the other hand, if it is judged that the instruction received from server 100 was not a job execution instruction (i.e. it was a stabilization execution instruction; step S6="no"), the apparatus returns to step S2. Then after executing the processing of steps S2 to S4, the apparatus waits again for an instruction from server 100 (step S5).

If, for example, the apparatus is instructed, by means of a user operating the power switch of the apparatus, to cut the power, the apparatus sends power-off information to server 100 and cuts the power.

Second Embodiment

Whereas the first embodiment was structured such that server 100 managed the execution interval of the stabilization processing in an external apparatus using time as a basis, in the second embodiment, time is replaced by the number of image processing operations as the basis to determine the timing of the stabilization execution. In a printer the number of image forming operations is used as a basis, and in a scanner the number of image reading operations is used as a basis.

With increases in the number of image processing operations executed in an external apparatus, there occurs a reduction in the image quality of print output as a result of the deterioration of the photosensitive drum and other elements. Thus the same effects as the first embodiment can be achieved by calculating the execution interval of the stabilization processing operation using the number of image processing operations executed by an external apparatus. In this case, the external apparatus is instructed to execute the stabilization processing based on the calculated number of image processing operations.

In the second embodiment, quantity-based stabilization schedule processing (FIG. 22) of step S200 replaces step S60 in the main routine of the first embodiment (FIG. 8), the job allotment processing (FIG. 24) of step S300 replaces step S70, and the execution sequence processing (FIG. 27) of step S400 replaces step S80.

Furthermore, image quality attribute information (i.e. the unit of measurement on the vertical axis of the graph in FIG. 5) used to control the stabilization execution timing according to the number of image processing operations needs to be obtained for an external apparatus beforehand by conducting tests, and then stored in the memory of the external apparatus. In the second embodiment, the fact that the image quality attribute information is based on the number of executed image processing operations distinguishes it from the image quality attribute information used in the first embodiment, which is determined in units of time.

In server 100, image quality attribute information is received from each external apparatus and stored in machine information table 121. Machine information table 121 is also required to store a prior stabilization number and a scheduled stabilization number, which replace the prior stabilization time and the scheduled stabilization time of the first embodiment.

The prior stabilization number is the accumulated number of image processing operations executed by an external apparatus up until the last execution of the stabilization processing. The accumulated number of image processing operations increases by an increment of one per page of print processing in the case of a printer, and by an increment of one per page of reading processing in the case of a scanner.

Here, server 100 manages the accumulated number of image processing operations for an external apparatus by accumulating the number of image processing operation per instructed job, and writing the accumulated number into information storage unit 120 so as to correspond to the apparatus instructed to execute the job. In this way, server 100 is able to keep track of the accumulated number of image processing operations for each apparatus. Thus when apparatus parameter information is sent from an external apparatus, server 100 reads the accumulated number of image processing operations for the apparatus and writes the read number into machine information table 121 as the prior stabilization number of the apparatus.

Alternatively, an external apparatus can calculate and store the number of image processing number it executes, and then when stabilization processing has been executed, server 100 can acquire the accumulated number of image processing operations from each apparatus via the network.

In contrast, the scheduled stabilization number is calculated and stored at the time that the number of image processing operations until the next scheduled stabilization processing is calculated (step S2030), as will be described in a later section.

The quantity-based stabilization schedule processing (FIG. 22), the job allotment processing (step S24), and the execution sequence processing (FIG. 27) are described below in the stated order.

Figure 22:
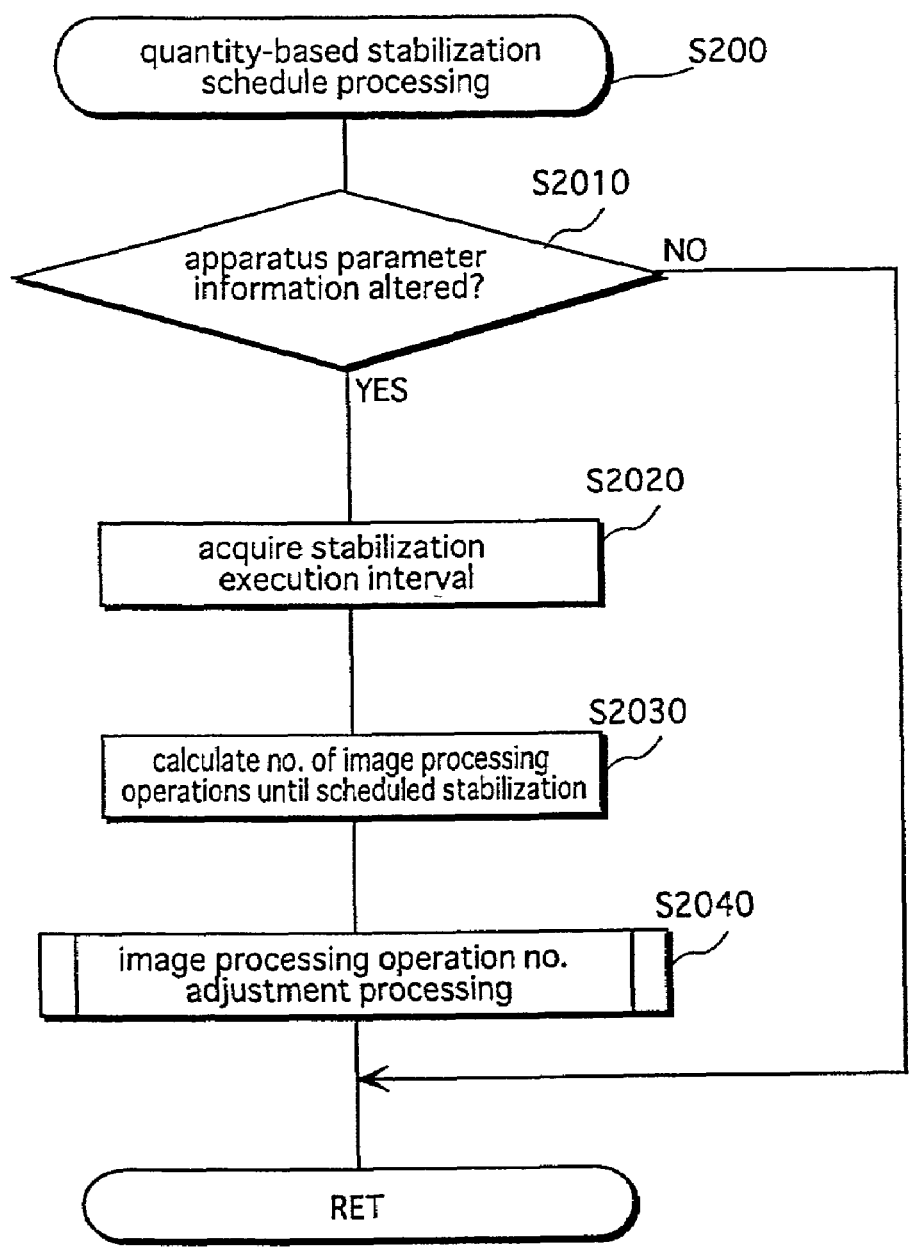
FIG. 22 is a flowchart showing a quantity-based stabilization processing subroutine according to a second embodiment.

Quantity-based Stabilization Schedule Processing FIG. 22 is a flowchart showing a subroutine of the quantity-based stabilization processing according to the second embodiment.

The judgment in step S2010 of whether the apparatus parameter information has changed is the same as in step S601, and will not be described here.

In step S2020, control unit 110 executes processing to acquire a stabilization execution interval. Here, the unit of measurement is the number of executed image processing operations.

In this processing, the stabilization execution interval is calculated based on both the image quality attribute information stored in machine information table 121 and the target image quality level stored in management information table 122.

Referring to the graph in FIG. 5, if the unit of measurement marked on the vertical axis is taken to be the number of executed image processing operations, and if every 1H is taken to represent 100 processing operations, then if the manager sets the target image quality level to be GL1, the stabilization execution interval for printer 501 is determined to be 200 processing operations.

In the calculation of the number of image processing operations until the next scheduled stabilization processing (step S2030), control unit 110 calculated the scheduled stabilization number by reading the prior stabilization number (i.e. the accumulated number of image processing operations at which the stabilization processing was last executed) stored in machine information table 121 and adds to the read number the stabilization execution interval determined in step S2020. Thus if the prior stabilization number of an external apparatus is 1000 processing operations and the stabilization execution interval is 200 processing operations, then the scheduled stabilization number is calculated as 1200 processing operations. In this case, control unit 110 sends a stabilization execution command to the apparatus when the $1200^{th}$ image processing operation has been executed, and has the apparatus execute the stabilization processing.

Figure 23:
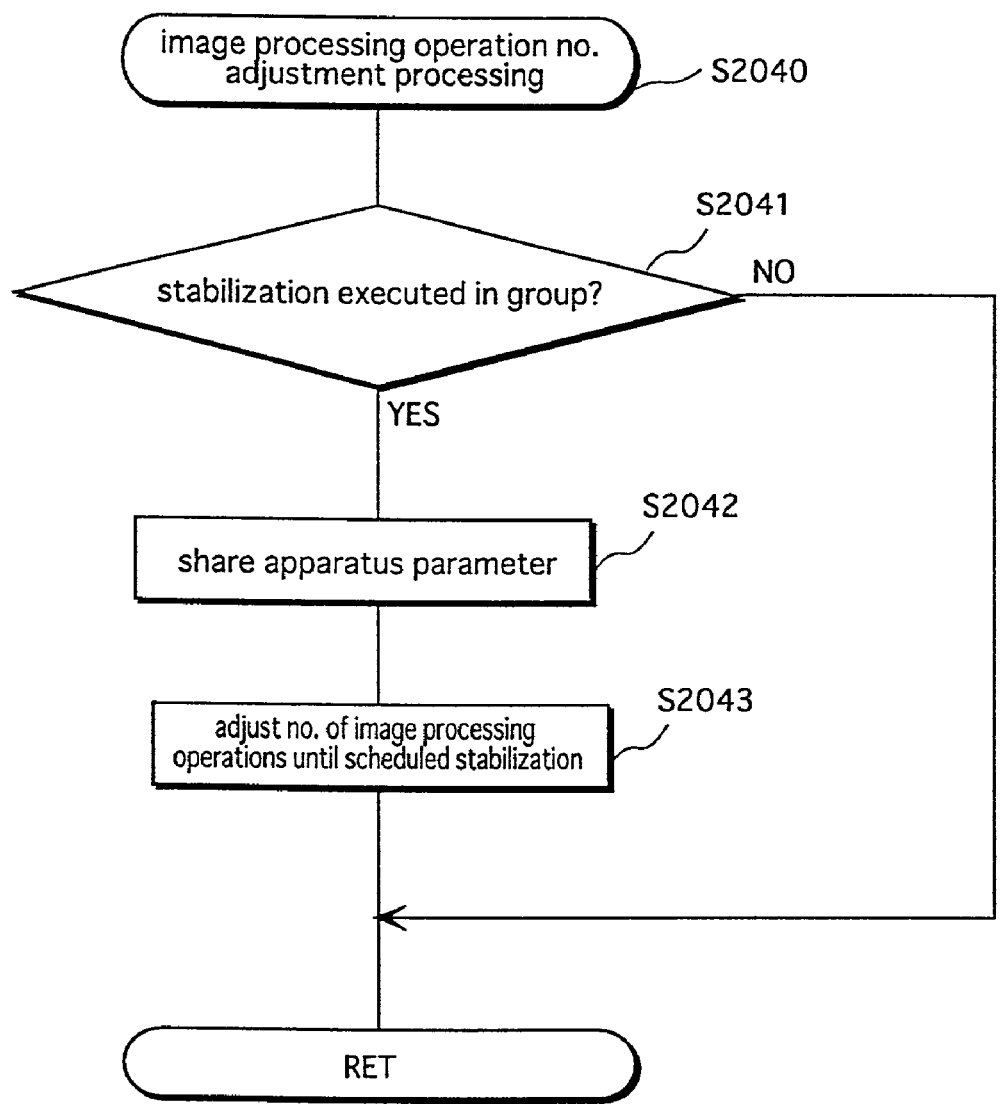
FIG. 23 is a flowchart showing an image processing operation number adjustment processing subroutine according to the second embodiment.

FIG. 23 is a flowchart showing a subroutine of the image processing operation number adjustment processing (step S2040) in FIG. 22.

The processing executed in steps S2041 and S2042 is the same as that in steps S6041 and S6042, and will not be described here.

Step S2043 is the equivalent of step S6043 (FIG. 14), except that the scheduled number of image processing operations is used instead of the scheduled time.

In other words, the number of image processing operations until the next scheduled stabilization processing is rewritten in order to have each external apparatus in the same group execute the stabilization processing on a rotational basis. This allows for the same effect to be achieved as in the first embodiment, in which the execution of the stabilization processing was managed using time as a basis. In other words, an excellent image quality can be achieved overall in the external apparatuses in a group, even though the apparatus parameters are being shared rather than calculated individually.

Job Allotment Processing

Figure 24:
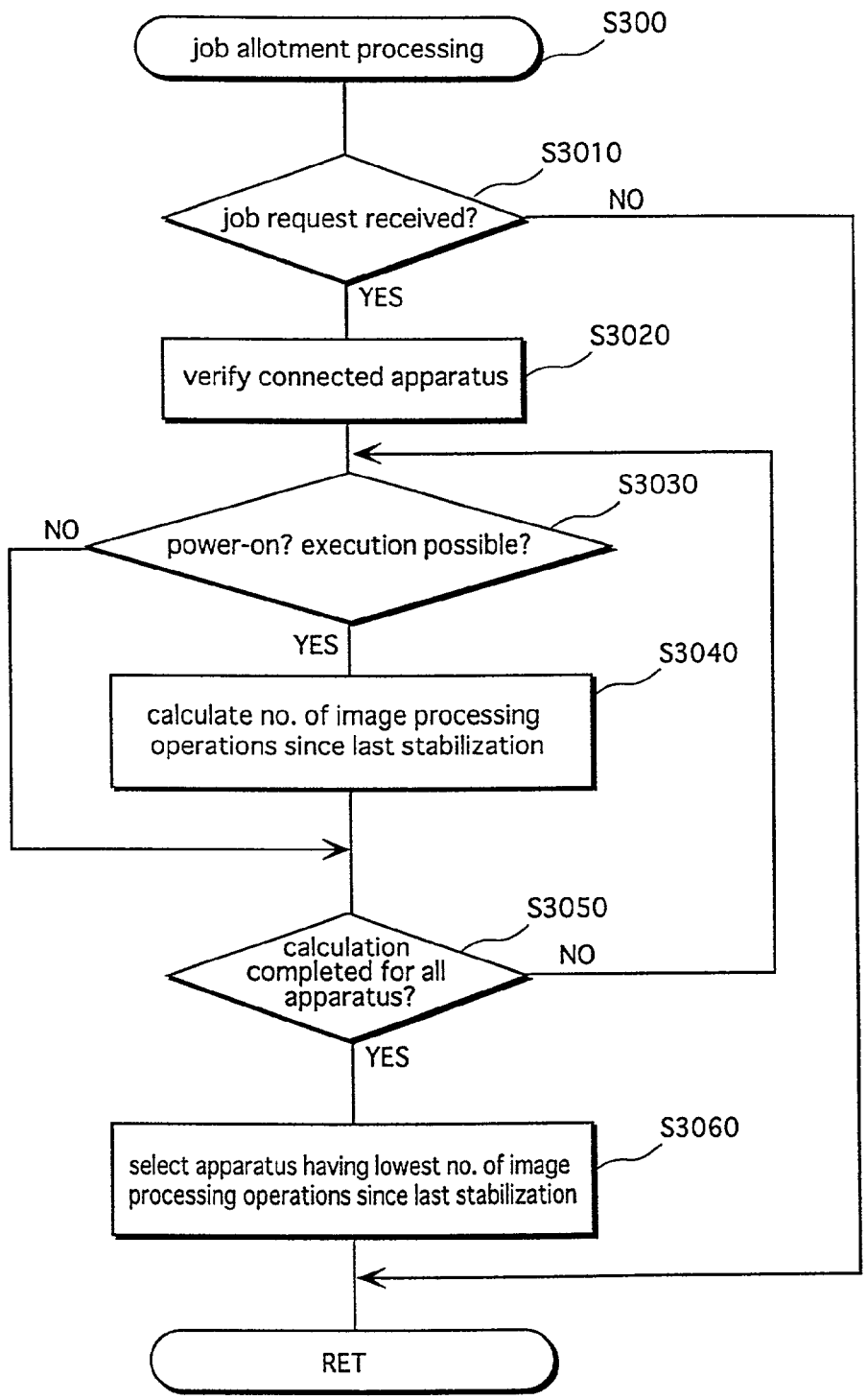
FIG. 24 is a flowchart showing a job allotment processing subroutine according to a second embodiment.

FIG. 24 is a flowchart showing a subroutine of the job allotment processing according to the second embodiment of the present invention.

Steps S3010 to S3030 correspond to steps S701 to S703 (FIG. 16). Thus when judged that a job request has been received from a terminal apparatus (step S3010="yes"), control unit 110 verifies the apparatus group targeted to executed the requested job (step S3020), and judges with respect to one of the apparatuses in the verified group, whether the apparatus is in a power-on state and capable of executing the requested job (step S3030).

If judged that the apparatus is able to execute the job (step S3030="yes"), control unit 110 reads the prior stabilization number for the apparatus from machine information table 121, calculates the difference (hereafter "processing operation differential") between the read number and the current accumulated number of image processing operations (step S3040), and temporarily stores the information showing the calculated processing operation differential in working memory 130 so as to correspond to the apparatus.

In step S3050, control unit 110 judges whether the processing of steps S3030 and S3040 have been completed for all of the apparatuses in the verified group, and if "no," returns to step S3030.

On the other hand, if judged "yes" for step S3050, control unit 110 acquires from working memory 130 the processing operation differential for each external apparatus, and comparing the acquired numbers, control unit 110 selects the apparatus having the lowest processing operation differential to execute the requested job (step S3060), and returns to the main routine. Control unit 110 stores information identifying the selected apparatus in the selected apparatus information column of job management table 123.

Selecting the apparatus having the lowest processing operation differential means that the job is executed by the apparatus having the least deteriorated image quality of print output.

Figure 25:
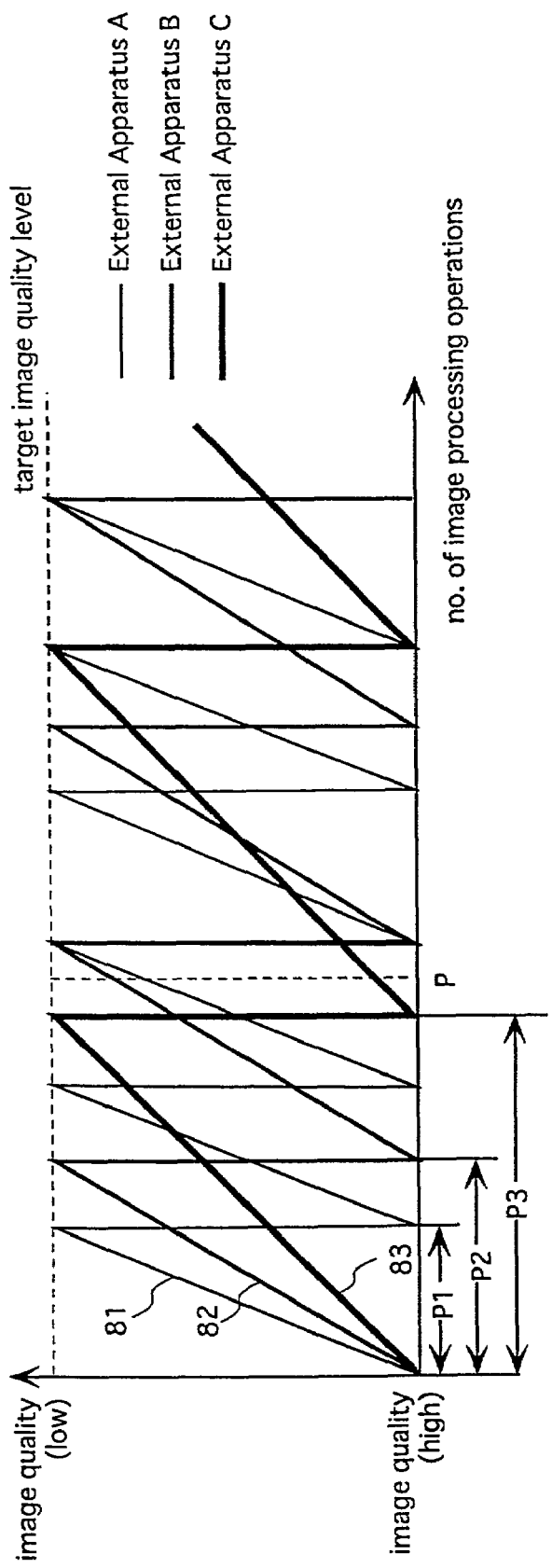
FIG. 25 is a schematic diagram showing the relationship between image quality and the number of image processing operations in three arbitrary external apparatuses.

FIG. 25 is a schematic diagram showing the relationship between image quality and the number of image processing operations in three external apparatuses A, B, and C. The zigzag lines 81, 82, and 83 show the variance in image quality in apparatuses A, B, and C, respectively. Intervals P1, P2, and P3 show the stabilization execution intervals as the accumulated number of image processing operations for apparatuses A, B, and C, respectively. Zigzag lines 81 to 83 show a cycle according to which image quality reduces over time, until the respective target image quality level is reached, at which point the stabilization processing is executed and the image quality is returned to a high level.

If, for example, a job is to be executed at P by one of apparatuses A, B, and C having the characteristics described above, then selection of the apparatus having the least number of executed image processing operations since the stabilization processing was last conducted (i.e. apparatus C) would be expected to yield the highest image quality of print output.

Figure 26:
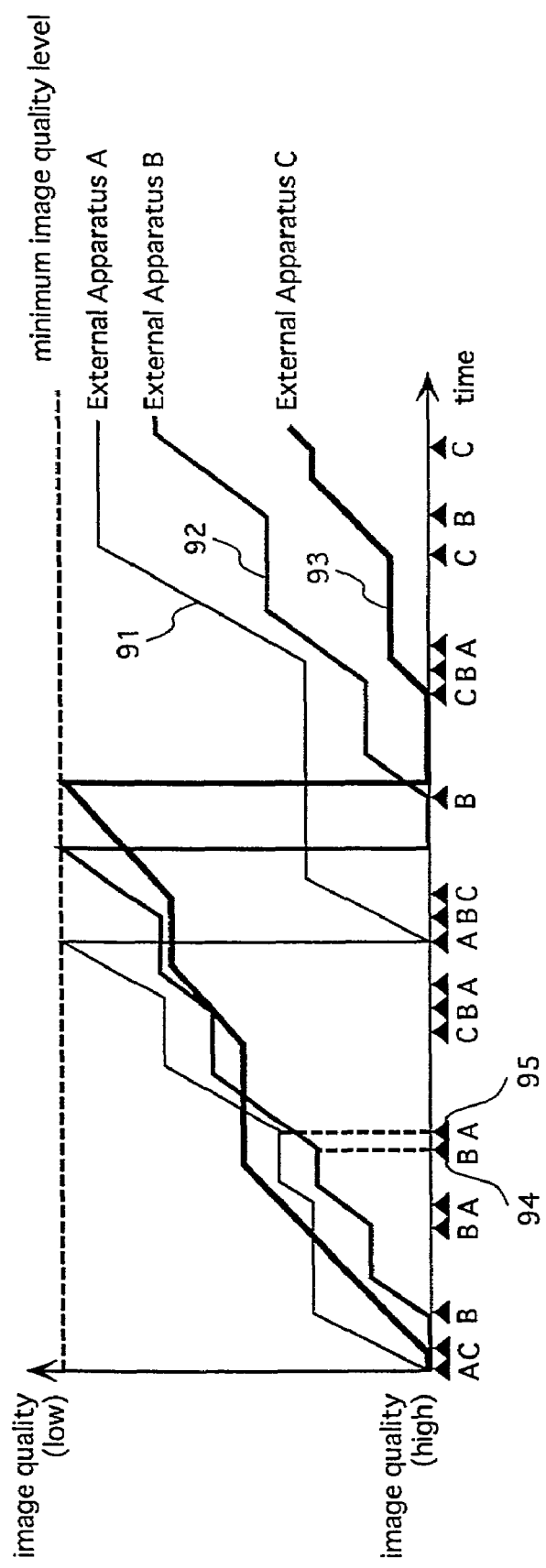
FIG. 26 shows an example of requested jobs being allotted to one of external apparatuses A, B, and C, in the job allotment processing.

FIG. 26 shows an exemplary allotment of a job to one of three external apparatuses A, B, and C, as part of the job allotment processing according to the second embodiment.

The triangular marks along the time axis represent the job allotment processing being executed in the order that the jobs are requested, and the apparatus selected to execute the respective jobs is noted below the triangular marks. Zigzag lines 91, 92, and 93 show the image quality variance for apparatuses A, B, and C, respectively. The sections of the zigzag lines running parallel to the time axis show the apparatuses when not executing a job (i.e. when waiting for an job execution instruction from server 100). The image quality is thereby shown as being uncharged for the periods that jobs are not being executed since the number of image processing operations is not increasing during these periods. In other words, the vertical axis effectively marks the number of image processing operations in addition to marking image quality.

For example, if the job allotment processing is executed at the triangular mark 94 with respect to a requested job, then it is judged that all of the apparatuses A, B, and C are not currently executing jobs and therefore available to execute the requested job. In this case, apparatus B is selected to execute the job since apparatus B has the least number of executed processing operations (i.e. the highest image quality of print output). Similarly, if the job allotment processing is executed at triangular mark 95 with respected to a further requested job, apparatuses A and C are judged capable of executing the job (i.e. apparatus B being unavailable because of currently executing previously requested job), and apparatus A having the least number of executed processing operations is selected to execute the job. Any further job allotment processing operations are conducted in the same manner.

Although the present embodiment was described in terms of the apparatus having the lowest processing operation differential being selected to execute the job, it is also possible, for example, to read from machine information table 121 the information showing the scheduled number of image processing operations before the next scheduled stabilization processing, calculate the difference between the current number of executed image processing operations and scheduled stabilization number (i.e. the accumulated number of image processing operations at which the next stabilization processing is scheduled), and select the apparatus having the highest calculated difference. This structure results in the same effect as when the external apparatus having the lowest processing operation differential is selected, since the apparatus having the highest calculated difference is also effectively the apparatus having the least number of processing operations since the stabilization was last executed.

Execution Sequence Processing

Figure 27:
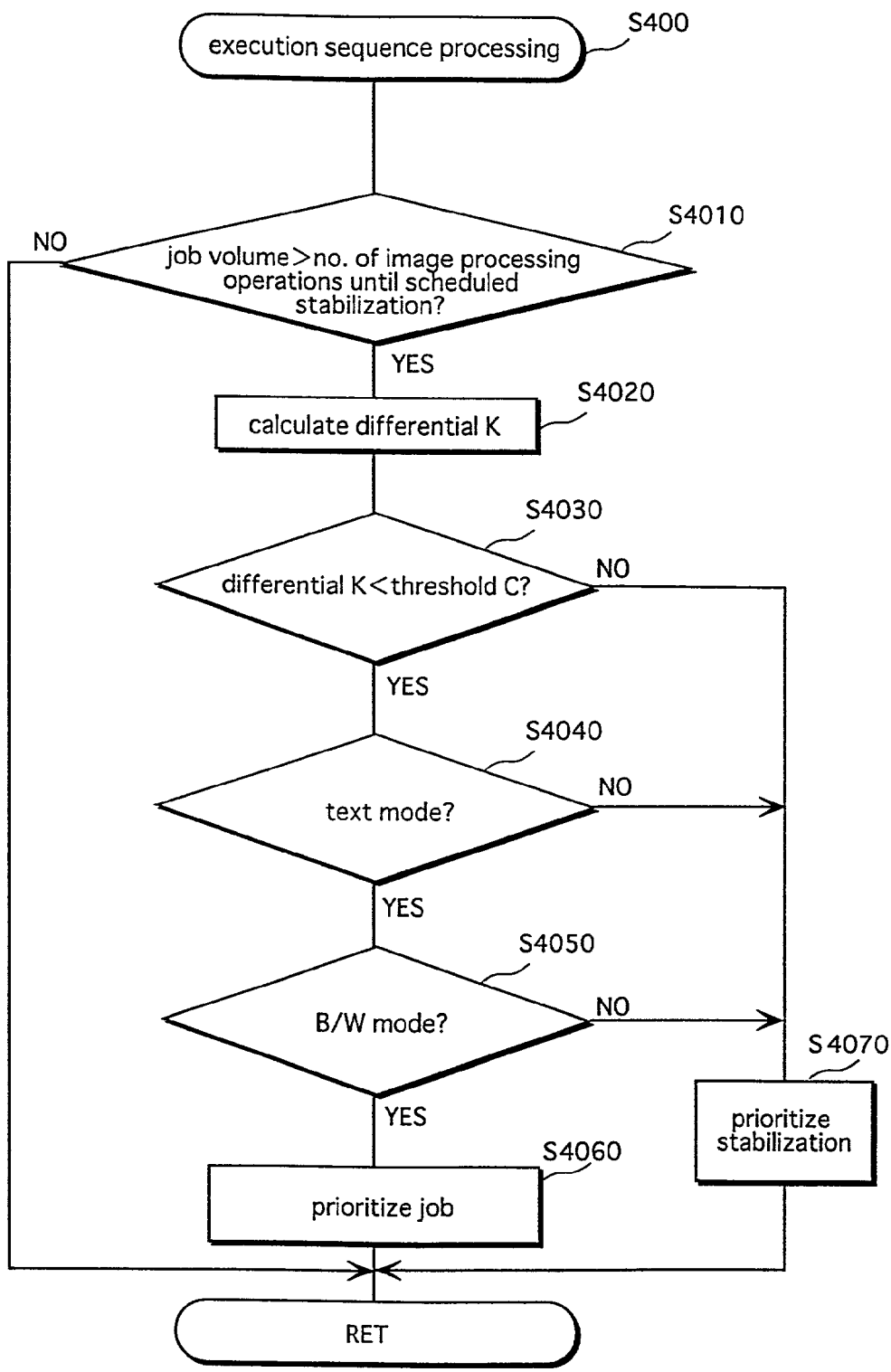
FIG. 27 is a flowchart showing an execution sequence processing subroutine according to the second embodiment.

FIG. 27 is a flowchart showing a subroutine of the execution sequence processing according to the second embodiment.

Control unit 110 firstly judges whether the volume of the job to be executed in an external apparatus exceeds the scheduled number of image processing operations until the next scheduled stabilization processing (step S4010). In "yes" then control unit 110 calculates differential K (step S4020), and judges whether the calculated differential K is less than a threshold value C (step S4030). As with thresholds A and B in the execution sequence processing according to the first embodiment (FIG. 18), it is desirable for threshold C to be set by the manager and written into the schedule information column of management information table 122.

If step S4030 is judged to be "no," (i.e. threshold K equal to or greater than threshold C), control unit 110 executes stabilization priority processing (step S4070), and returns to the main routine. On the other hand, if step S4030 judged to be "yes," (i.e. threshold K less than threshold C), control unit 110 executes the processing of steps S4040 to S4060, and returns to the main routine.

The processing of steps S4040 to S4060 corresponds to that of steps S803 to S805 in FIG. 18, and will not be described here. Also, the stabilization priority processing (step S4070) corresponds to the processing executed in step S806 (FIG. 18), and will not be described here.

Thus by executing the processing of steps S4010 to S4030, it is possible to execute the execution sequence processing in server 100, even when the execution timing of the stabilization processing is determined based on the number of image processing operations.

Furthermore, the present invention is not limited to an image processing system, and can be applied to a server (management apparatus) or external apparatus included in an image processing system. The present apparatus can also be a method for managing a plurality of external apparatuses. The present invention may also be a computer program for having a computer execute the method. Moreover, the present invention can also be a computer readable storage medium storing the computer program, the storage medium being, for example, a flexible disc, a hard disk, a CD-ROM, an MO, a DVD, a DVD-ROM, a DVD-RAM, a semiconductor memory.

In case of the present invention being a computer program, it is not necessary for the computer program to include all the modules for having the computer execute the processing described above. For example, it is possible to have the computer execute the various processing operations of the present invention by using a common computer program capable of installing the required modules at a later date, examples of such computer programs being a transmission computer program or a computer program included in the operating system (OS).

Variations

The present invention is, of course, not limited the embodiments described above, and may include any of the following variations.

(1) Since it is only required that the server, terminal apparatuses, and external apparatuses included in the image processing system of the present invention be connected so as to allow communication between the various elements, the connection does not have to be made using a specialized cable for a LAN or similar network. The system can be applied, for instance, by structuring the network using a method according to which the terminal apparatuses and other elements carry out communications via a power line.

(2) The embodiments of the present invention as described above are structured such that the manager operates manager PC 200 in order to input management information such as a target image quality level. However, it is possible, for example, for the system to be structured such that the manager inputs the management information directly into server 100. In this case server 100 additionally serves as a management apparatus.

It is also possible for the system to be structured such that the manager inputs the target image quality level and other management information using an operation panel included as part of an external apparatus.

Figure 28:
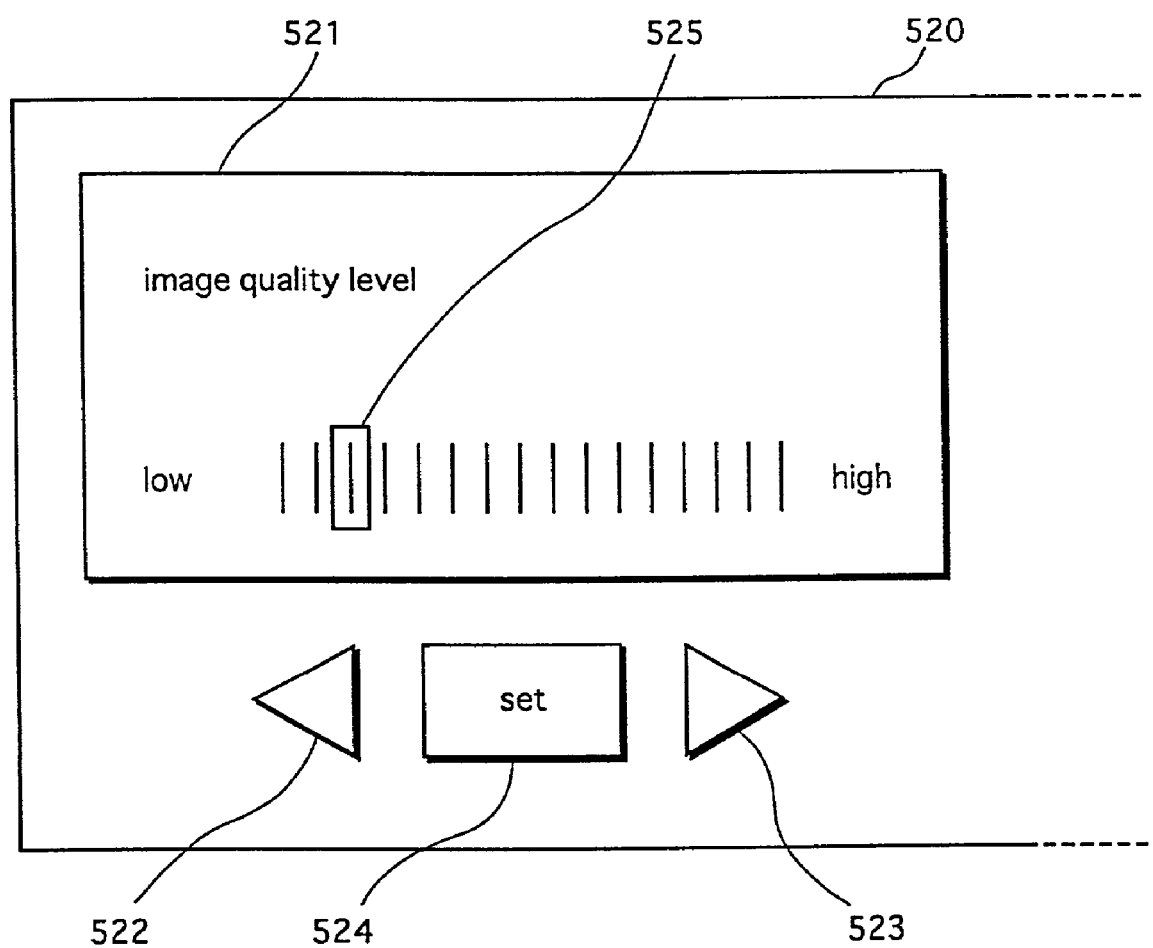
FIG. 28 shows an exemplary structure of an operation panel 520 in an arbitrary external apparatus.

FIG. 28 shows an exemplary structure of an operation panel 520 included in a printer. For ease of understanding, FIG. 28 only shows an input unit 521 of the target image quality level. Input unit 521 includes keys 522 and 523 for altering the target image quality level setting, and a set key 524 for setting the altered target image quality level.

When the manager operates key 522, display 525 showing the image quality level being reduced to a lower value, and when the manager operates key 523, display 525 shows the image quality level being increased to a higher level. Display 525 is divided into 16 different levels, and in FIG. 28 a level three levels from the bottom is selected as the target image quality level. Here, level 3 will be set as the target image quality level and stored in memory if the manager operates set key 524.

When the target image quality level of an external apparatus is set by the manager, the external apparatus (e.g. printers, etc.) sends information showing the set level to server 100. On receipt of the information showing the set target image quality level from the apparatus, it is desirable for server 100 to store the received information in machine information table 121.

In this structure, in which the manager uses the operation unit of an external apparatus to enter the target image quality level, it is possible for the system to be structured such that the external apparatus determines its own stabilization execution interval based on the entered target image quality level and stored image quality attribute information (i.e. equivalent of step S602 in FIG. 13), sets the next scheduled stabilization time (i.e. equivalent of step S603), and executes the stabilization processing when the set time is reached. In this case, the external apparatus executes the stabilization processing independently based on the entered target image quality level, thus removing the need to be connected to a network.

In manager PC 200 or the external apparatuses, as the case may be, it is not necessary to directly set the image quality level (e.g. GL1, etc.), but rather set the target image quality level according to various applications depending, for example, on whether or not the jobs only relate to text images or monochrome prints. If the jobs only relate to text images or monochrome prints, meaning that a high image quality level is not required, a low level can be automatically set, and if jobs such as photographic images or color prints requiring a high image quality are requested a high image quality level can be automatically set as the target image quality level. Thus by determining the stabilization execution interval based on the changed target image quality level and the image quality attribute information, it is possible to vary the timing of the stabilization processing in response to set applications.

(3) Although the embodiments of the present invention have been described in terms of the manager setting image quality levels such as GL1 and GL2 as the target image quality level, it is possible for the target image quality level to be set automatically. For example, the image quality level of an external apparatus in which the default image mode (i.e. the image mode predetermined when power is supplied or when image processing is not executed at a predetermined time) is text mode, can be automatically set at a low image quality level of GL2, for example, while on the other hand, the image quality level of another image processing apparatus in which the default image mode is photo mode, can be automatically set at a high image quality level of GL1, for example. In this way the image quality level can be set automatically in accordance with the default image mode.

Alternatively, the number of scheduled jobs to be executed in text mode can be compared with the number of scheduled jobs to be executed in photo mode, using as the unit of measurement, for example, a predetermined time, a predetermined number of jobs, or a predetermined number of image processing operations. Then if the majority of jobs are text mode jobs, the image quality level can be set at a low level (e.g. GL2), and if the majority of jobs are photo mode jobs, the image quality level can be set at a high level (e.g. GL1).

(4) Although the embodiments of the present invention were described in terms of the group formation processing being executed using the environment variance information, it is alternatively possible to use the image quality attribute information. The image quality attribute information shows image quality levels that can be maintained for a given execution frequency of the stabilization processing. In other words, the image quality attribute information also effectively shows the degree of image quality deterioration per unit of time or per image processing operation. Thus by allotting the jobs evenly among the external apparatuses within a group using the image quality attribute information as the group formation information, it is possible to achieve a fairly even rate of reduction in image quality within the group, even when repeatedly using the apparatus parameter information obtained from the same apparatus in the group. As a result, the variance from the target image quality level can be kept to a minimum. Furthermore, by allotting jobs to the group having a small deterioration in image quality per unit of time or per image processing operation, and allotting the jobs evening among the apparatuses in the targeted group, it is possible to have the jobs executed by the apparatus having the least deterioration in image quality of print output. As a result, the execution frequency of the stabilization processing can be reduced and saving in power usage realized for the image processing system as a whole.

(5) Although the embodiments of the present invention were described in terms of the environment variance information being used as the group formation information in the execution of the group formation processing, it is possible to use the image quality attribute information in combination with the environment variance information as the group forming information. In this case, the external apparatuses having values close to the values shown in both the environment variance information and the image quality attribute information are formed into the same group, which means that even if the apparatus parameters obtained from the same one apparatus of the group are shared, it will be possible to maintain a fairly even rate of reduction in image quality among the apparatus in the group.

(6) According to the embodiments of the present invention as described above, a server (PC) is provided as a management apparatus, and the server executes management parameter alteration processing, job request reception processing, machine information reception processing, group formation processing, time-based stabilization schedule processing, job allotment processing, execution sequence processing, command transmission processing, and job reception processing. However, it is possible to have a specified image processing apparatus function additionally as a management apparatus. In this case, the image processing apparatus functioning additionally as the management apparatus can be given priority over the other image processing apparatuses in conducting the stabilization processing, or alternatively it is possible for the setting of the scheduled stabilization time and the allotting of jobs to be conducted on an equal basis with the other image processing apparatuses.

(7) According to the embodiment of the present invention as described above, image density was used as the main determinant of image quality levels, and the determination of the optimal adjustment values of the control variables was based mainly on changes in image density. However, it is alternatively possible for elements such as image positioning or color balance to be used in determining image quality levels, and for the determination of the optimal adjustment values of the control variables to be based on changes in these elements.

(8) Although the embodiments of the present invention were described with reference to examples using the number of print pages for printers and the number of document pages for scanners, the present invention is not limited to these examples. It is alternatively possible to use, for example, the data size of the image data for a job, the number of received jobs, or the total number of pages for a plurality of jobs.

(9) Although the embodiments of the present invention were described with respect to an image processing system in which external apparatuses being printers and scanners are connected to server 100, it is possible to apply the present invention to an overall system in which image processing apparatus such as copiers and facsimiles that function to execute image quality stabilization processing are connected to server 100 as external apparatuses.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing system having a server, a terminal apparatus, and a plurality of image processing apparatuses that execute image quality stabilization processing, the server being connected via a network to the terminal apparatus and each image processing apparatus, said server including:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job, and each image processing apparatus including:

an image processing unit for executing the requested job when instructed to do so by the server;

the acquisition unit acquires, as the information, a time period elapsed since the image quality stabilization processing was last executed, and the selection unit selects the image processing apparatus having the shortest elapsed time period.

2. An image processing system having a server, a terminal apparatus, and a plurality of image processing apparatuses that execute image quality stabilization processing, the server being connected via a network to the terminal apparatus and each image processing apparatus, said server including:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job, and each image processing apparatus including:

an image processing unit for executing the requested job when instructed to do so by the server;

wherein the acquisition unit acquires, as the information, a time period until the next scheduled execution of the image quality stabilization processing, and the selection unit selects the image processing apparatus having the longest time period.

3. An image processing system having a server, a terminal apparatus, and a plurality of image processing apparatuses that execute image quality stabilization processing, the server being connected via a network to the terminal apparatus and each image processing apparatus, said server including:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job, and each image processing apparatus including:

an image processing unit for executing the requested job when instructed to do so by the server;

the acquisition unit acquires, as the information, a scheduled number of image processing operations to be executed before the next scheduled execution of the image quality stabilization processing, and the selection unit selects the image processing apparatus having the highest scheduled number of image processing operations.

4. The system, according to claim 1, wherein the acquisition unit judges whether the image quality stabilization processing operation is currently being executed, and acquires the information for an image processing apparatus judged not to be currently executing the image quality stabilization processing operation.

5. The system according to claim 1, wherein the acquisition unit acquires the information from each image processing apparatus.

6. The system according to claim 1, wherein the plurality of image processing apparatuses are a plurality of image forming apparatuses.

7. A server connected via a network to a terminal apparatus and a plurality of image processing apparatuses that execute image quality stabilization processing, comprising:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job;

the acquisition unit acquires, as the information, a time period elapsed since the image quality stabilization processing was last executed, and the selection unit selects the image processing apparatus having the shortest elapsed time period.

8. A server connected via a network to a terminal apparatus and a plurality of image processing apparatuses that execute image quality stabilization processing, comprising:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job;

the acquisition unit acquires, as the information, a time period until the next scheduled execution of the image quality stabilization processing, and the selection unit selects the image processing apparatus having the longest time period.

9. A server connected via a network to a terminal apparatus and a plurality of image processing apparatuses that execute image quality stabilization processing, comprising:

a reception unit for receiving from the terminal apparatus a request to execute a job related to an image processing operation;

an acquisition unit for acquiring information relating to an execution condition of the image quality stabilization processing with respect to each image processing apparatus, wherein execution of the image quality stabilization processing results in optimal adjustment values of the image processing apparatus;

a selection unit for selecting, based on the acquired information, one of the image processing apparatuses to execute the requested job; and an instruction unit for instructing the selected image processing apparatus to execute the requested job; wherein the acquisition unit acquires, as the information, a scheduled number of image processing operations to be executed before the next scheduled execution of the image quality stabilization processing, and the selection unit selects the image processing apparatus having the highest scheduled number of image processing operations.

10. The server according to claim 7, wherein the acquisition unit judges whether the image quality stabilization processing operation is currently being executed, and acquires the information for an image processing apparatus judged not to be currently executing the image quality stabilization processing operation.

11. The server according to claim 7, wherein the acquisition unit acquires the information from each image processing apparatus.

12. The system according to claim 2, wherein the acquisition unit judges whether the image quality stabilization processing operation is currently being executed, and acquires the information for an image processing apparatus judged not to be currently executing the image quality stabilization processing operation.

13. The system according to claim 2, wherein the acquisition unit acquires the information from each image processing apparatus.

14. The system according to claim 2, wherein the plurality of image processing apparatuses are a plurality of image forming apparatuses.

15. The system according to claim 3, wherein the acquisition unit judges whether the image quality stabilization processing operation is currently being executed, and acquires the information for an image processing apparatus judged not to be currently executing the image quality stabilization processing operation.

16. The system according to claim 3, wherein the acquisition unit acquires the information from each image processing apparatus.

17. The system according to claim 3, wherein the plurality of image processing apparatuses are a plurality of image forming apparatuses.

18. The server according to claim 8, wherein the acquisition unit judges whether the image quality stabilization processing operation is currently being executed, and acquires the information for an image processing apparatus judged not to be currently executing the image quality stabilization processing operation.

19. The server according to claim 8, wherein the acquisition unit acquires the information from each image processing apparatus.

20. The server according to claim 9, wherein the acquisition unit judges whether the image quality stabilization processing operation is currently being executed, and acquires the information for an image processing apparatus judged not to be currently executing the image quality stabilization processing operation.

21. The server according to claim 9, wherein the acquisition unit acquires the information from each image processing apparatus.

22. A management method used by a server connected via a network to a terminal apparatus and a plurality of image processing apparatuses that execute image quality stabilization processing, comprising:
a reception step of receiving from the terminal apparatus a request to execute a job relating to an image processing operation;
an acquisition step of acquiring information relating to an execution condition of the image quality stabilization processing with respect to each image processing apparatus, wherein execution of the image quality stabilization processing results in optimal adjustment values of the image processing apparatus;
a selection step of selecting, based on the acquired information, one of the image processing apparatuses to execute the requested job; and
a instruction step of instructing the selected image processing apparatus to execute the job,
wherein
the acquisition step acquires, as the information, a time period elapsed since the image quality stabilization processing was last executed, and
the selection step selects the image processing apparatus having the shortest elapsed time period.

23. A management method used by a server connected via a network to a terminal apparatus and a plurality of image processing apparatuses that execute image quality stabilization processing, comprising:
a reception step of receiving from the terminal apparatus a request to execute a job relating to an image processing operation;
an acquisition step of acquiring information relating to an execution condition of the image quality stabilization processing with respect to each image processing apparatus, wherein execution of the image quality stabilization processing results in optimal adjustment values of the image processing apparatus;
a selection step of selecting, based on the acquired information, one of the image processing apparatuses to execute the requested job; and
a instruction step of instructing the selected image processing apparatus to execute the job,
wherein
the acquisition step acquires, as the information, a time period until the next scheduled execution of the image quality stabilization processing, and
the selection step selects the image processing apparatus having the longest time period.

24. A management method used by a server connected via a network to a terminal apparatus and a plurality of image processing apparatuses that execute image quality stabilization processing, comprising:
a reception step of receiving from the terminal apparatus a request to execute a job relating to an image processing operation;
an acquisition step of acquiring information relating to an execution condition of the image quality stabilization processing with respect to each image processing apparatus, wherein execution of the image quality stabilization processing results in optimal adjustment values of the image processing apparatus;
a selection step of selecting, based on the acquired information, one of the image processing apparatuses to execute the requested job; and
a instruction step of instructing the selected image processing apparatus to execute the job,
wherein
the acquisition step acquires, as the information, a scheduled number of image processing operations to be executed before the next scheduled execution of the image quality stabilization processing, and
the selection step selects the image processing apparatus having the highest scheduled number of image processing operations.

25. A computer-readable medium storing a computer program executed by a server connected via a network to a terminal apparatus and a plurality of image processing apparatuses that execute image quality stabilization processing, comprising:

a reception step of receiving from the terminal apparatus a request to execute a job relating to an image processing operation;

an acquisition step of acquiring information relating to an execution condition of the image quality stabilization processing with respect to each image processing apparatus, wherein execution of the image quality stabilization processing results in optimal adjustment values of the image processing apparatus;

a selection step of selecting, based on the acquired information, one of the image processing apparatuses to execute the requested job; and an instruction step of instructing the selected image processing apparatus to execute the job;

wherein the acquisition step acquires, as the information, a time period elapsed since the image quality stabilization processing was last executed, and the selection step selects the image processing apparatus having the shortest elapsed time period.

26. A computer-readable medium storing a computer program executed by a server connected via a network to a terminal apparatus and a plurality of image processing apparatuses that execute image quality stabilization processing, comprising:

a reception step of receiving from the terminal apparatus a request to execute a job relating to an image processing operation;

an acquisition step of acquiring information relating to an execution condition of the image quality stabilization processing with respect to each image processing apparatus, wherein execution of the image quality stabilization processing results in optimal adjustment values of the image processing apparatus;

a selection step of selecting, based on the acquired information, one of the image processing apparatuses to execute the requested job; and an instruction step of instructing the selected image processing apparatus to execute the job;

wherein the acquisition step acquires, as the information, a time period until the next scheduled execution of the image quality stabilization processing, and the selection step selects the image processing apparatus having the longest time period.

27. A computer-readable medium storing a computer program executed by a server connected via a network to a terminal apparatus and a plurality of image processing apparatuses that execute image quality stabilization processing, comprising:

a reception step of receiving from the terminal apparatus a request to execute a job relating to an image processing operation;

an acquisition step of acquiring information relating to an execution condition of the image quality stabilization processing with respect to each image processing apparatus, wherein execution of the image quality stabilization processing results in optimal adjustment values of the image processing apparatus;

a selection step of selecting, based on the acquired information, one of the image processing apparatuses to execute the requested job; and an instruction step of instructing the selected image processing apparatus to execute the job;

wherein the acquisition step acquires, as the information, a scheduled number of image processing operations to be executed before the next scheduled execution of the image quality stabilization processing, and the selection step selects the image processing apparatus having the highest scheduled number of image processing operations.

* * * * *